United States Patent
Jensen et al.

(10) Patent No.: US 6,571,189 B2
(45) Date of Patent: May 27, 2003

(54) SYSTEM AND METHOD FOR SCANNER CALIBRATION

(75) Inventors: Nanette C. Jensen, Meridian, ID (US); Douglas G. Keithley, Boise, ID (US); Virginia K. Capps, Boise, ID (US); David G. Bohan, Eagle, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 3 days.

(21) Appl. No.: 09/855,211

(22) Filed: May 14, 2001

(65) Prior Publication Data

US 2002/0169574 A1 Nov. 14, 2002

(51) Int. Cl.$^7$ .............................................. G01C 19/00
(52) U.S. Cl. .................. 702/104; 250/559.1; 250/208.1
(58) Field of Search .......................... 702/90, 91, 104; 399/32, 47, 51, 59, 31, 74; 358/3, 23, 3.22, 406, 461, 448, 462, 464, 465, 471–498; 250/559.1, 208.1, 235

(56) References Cited

U.S. PATENT DOCUMENTS

| 4,408,231 A | * | 10/1983 | Bushaw et al. ............. 358/406 |
| 4,602,291 A | * | 7/1986 | Temes ........................ 348/243 |
| 5,223,896 A | * | 6/1993 | Shimizu et al. ................ 399/46 |
| 5,285,293 A | * | 2/1994 | Webb et al. ................. 348/251 |

\* cited by examiner

*Primary Examiner*—John Barlow
*Assistant Examiner*—Anthony Dougherty

(57) ABSTRACT

A system and method are provided for calibrating an output from a sensor array in a scanner. The system comprises a processor circuit having a processor and a memory. Stored on the memory and executable by the processor is the scanner calibration logic. The scanner calibration logic comprises logic for determining a minimum dark value for the sensor array, and logic for determining an optimum exposure time of a number of light sources associated with the sensor array. The scanner calibration logic also includes logic for determining a maximum white value for the sensor array at the exposure time, and logic for setting an analog offset based upon the minimum dark value. The scanner calibration logic further comprises logic for setting an analog gain associated with the sensor array based on a sensor output range from the minimum dark value to a maximum white value.

45 Claims, 11 Drawing Sheets

SYSTEM AND METHOD FOR SCANNER CALIBRATION

CROSS REFERENCE TO RELATED APPLICATIONS

This application is related to co-pending US patent application entitled "System and Method for Determining Light Source Current" assigned Ser. No. 09/855,208, filed on even date herewith.

TECHNICAL FIELD

The present invention is generally related to the field of scanning technology and, more particularly, is related to a system and method for scanner calibration.

BACKGROUND OF THE INVENTION

With the dawn of the information age, scanning technology that is employed to convert paper or other documents into digital documents plays an important role. In particular, scanning technology plays a very important role in reducing the amount of paper that is created in a typical business environment. Scanners contribute to an increase in the speed at which business affairs are conducted. For example, documents that are scanned into digital form may then be transmitted to recipients via the Internet or other network rather than using traditional mail or other couriers.

With all the promise and benefits of scanning technology, it still is plagued with various problems that may often prevent the faithful reproduction of hardcopy documents into digital form. For example, many scanners include inherent imperfections that mar the digital reproduction of scanned documents. Specifically, variations in optics such as lenses employed in scanners may contribute to less than perfect image creation. The various scanner sensors including those within sensor arrays may respond to power supply voltage differently and sensor output voltage ranges may vary from sensor to sensor. Also, variations in sensors generally exist due to process variations during the manufacturing. The light sources such as light emitting diodes (LEDs) employed in scanners often vary in their performance due to process variations as well.

In addition, typically scanners are plagued with sensor failure over time due to degradation, usage, and incidental damage, etc. For example, in some cases, over time a few sensors may experience failure and constantly emit a single output voltage due to damage or degradation. Such failure may manifest itself in the appearance of vertical streaks or lines in a digital document produced by such a scanner. Unfortunately, it is difficult to counter the effects of such errant sensors.

SUMMARY OF THE INVENTION

In view of the forgoing, the present invention provides for a system and method for calibrating an output from a sensor array in a scanner. In one embodiment, the system comprises a processor circuit having a processor and a memory. Stored on the memory and executable by the processor is the scanner calibration logic. The scanner calibration logic comprises logic for determining a minimum dark value for the sensor array, and logic for determining an optimum exposure time of a number of light sources associated with the sensor array. The scanner calibration logic also includes logic for determining a maximum white value for the sensor array at the exposure time, and logic for setting an analog offset based upon the minimum dark value. The scanner calibration logic further comprises logic for setting an analog gain associated with the sensor array based on a sensor output range from the minimum dark value to a maximum white value.

The present invention may also be viewed as a method for calibrating an output from a sensor array in a scanner. In this regard, the present method comprises the steps of determining a minimum dark value for the sensor array; determining an optimum exposure time of a number of light sources associated with the sensor array; determining a maximum white value for the sensor array at the exposure time; setting an analog offset based upon the minimum dark value; and, setting an analog gain associated with the sensor array based on a sensor output range from the minimum dark value to a maximum white value.

The system and method of the present invention help determine and disqualify malfunctioning sensors in the sensor array from operation. Consequently, the scanner may continue to be used without the negative effects of malfunctioning sensors such as streaks and other anomalies.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
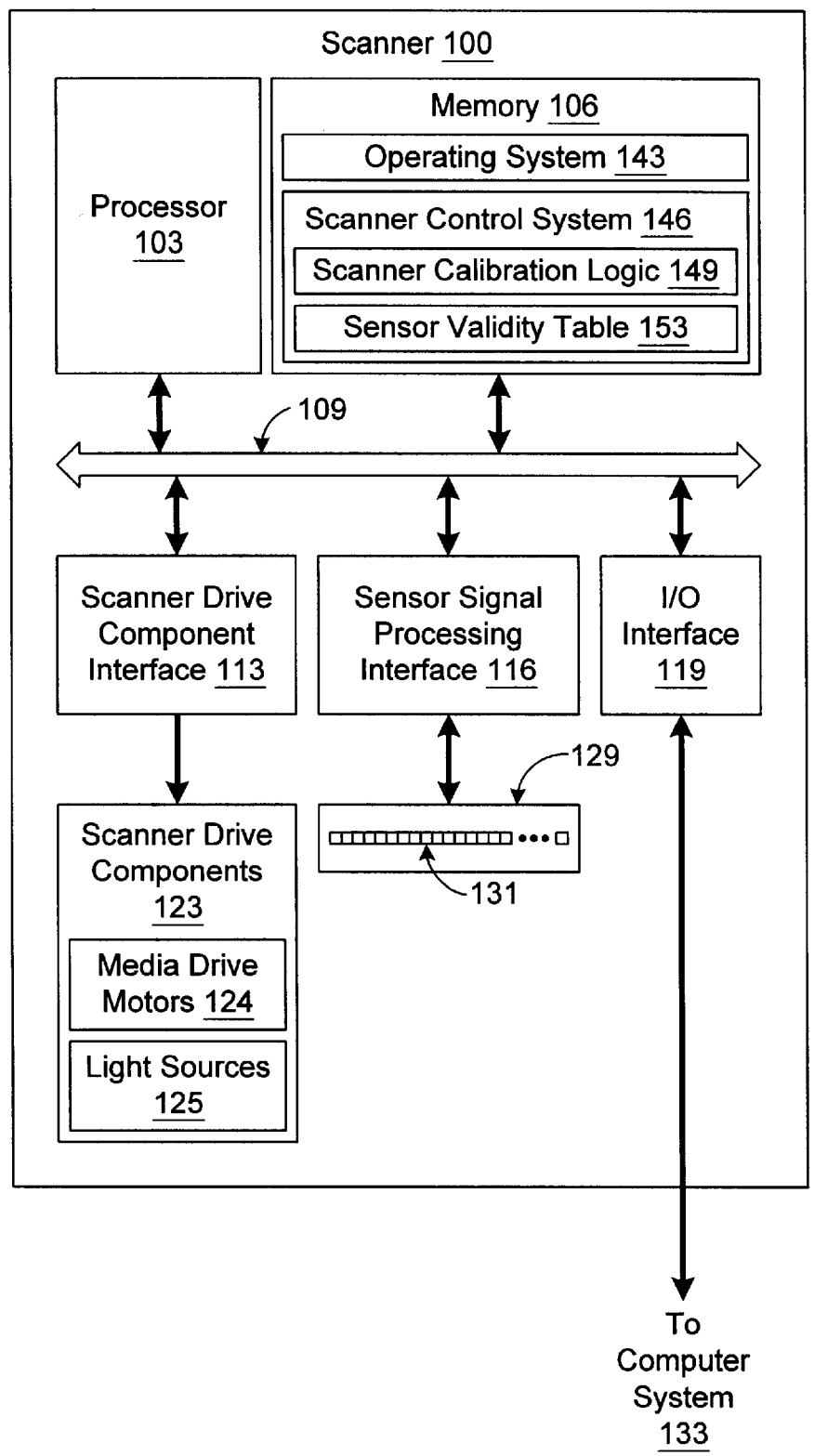
FIG. 1 is a drawing of a scanning system that employs scanner calibration logic according to an embodiment of the present invention.

Turning to FIG. 1, shown is a scanner 100 according to an aspect of the present invention. The scanner 100 includes a processor circuit with a processor 103 and a memory 106, both of which are coupled to a local interface 109. The local interface 109 may be, for example, a data bus with an accompanying control bus as is generally known by those with ordinary skill in the art. Coupled to the local interface 109 is a scanner drive component interface 113, a sensor signal processing interface 116, and an input/output (I/O) interface 119. The scanner 100 also includes scanner drive components 123 that are coupled to the local interface 109 through the scanner drive component interface 113.

The scanner drive components 123 may include, for example, media drive motors 124, scanner light sources 125, indicator lights, and other components that are employed in the general operation of a scanner 100 as is generally known by those with ordinary skill in the art. The drive motors 124 are employed, for example, to shuttle a scan target such as a paper document or other media along a paper pathway, etc. The light sources 125 include three different color lights that illuminate the scan target during the course of a scan operation. For example, the light sources 125 may include red, green, and blue light emitting diodes that generate light that is distributed across a scan target with a light pipe as is generally known by those with ordinary skill in the art.

The scanner 100 also includes a sensor array 129 that is coupled to the local interface 109 through the sensor signal processing interface 116. The sensor array 129 includes a number of sensors 131. The sensors 131 are arranged in a row, for example, to enable the scanning of lines in a document as it progresses through the scanner 100. The sensor array 129 may be, for example, a contact image sensor or other similar device.

The sensor signal processing interface 116 includes sensor signal processing circuitry to processes a number of signals produced by the sensors 131 in the sensor array 129 during the course of a scanning operation. The sensor signal processing interface 116 also includes buffering circuitry and/or a memory that provides for the temporary storage of the sensor values obtained from the sensors 131 for access by the processor 103 via the local interface 109. The I/O interface 119 provides the scanner information obtained from a scan operation to a computer system 133 or other device. In addition, the I/O interface 119 facilitates communication with the computer system 133 during the normal operation of the scanner 100 as is generally known by those with ordinary skill in the art.

The scanner drive component interface 113, sensor signal processing interface 116, and the input/output interface 119 each include appropriate buffering circuitry as is generally known by those with ordinary skill in the art to make information available to the processor 103. Also, the same components provide various registers to which the processor 103 may write data as is generally known by those with ordinary skill in the art.

The memory 106 may include both volatile and nonvolatile memory components. Volatile components are those that do not retain data values upon loss of power. Nonvolatile components are those that retain data upon a loss of power. Thus, the memory 106 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

In addition, the processor 103 may represent multiple processors and the memory 106 may represent multiple memories that operate in parallel. In such a case, the local interface 109 may be an appropriate network that facilitates communication between any two of the multiple processors or between any processor and any of the memories, etc. The local interface 109 may facilitate memory to memory communication as well. The processor 103, memory 106, and local interface 109 may be electrical or optical in nature. Also, the memory 106 may be magnetic in nature.

The scanner 100 includes various components that are stored on the memory 106 and executable by the processor 103 in performing the functionality of the scanner 100. In particular, stored on the memory 106 is an operating system 143 and a scanner control system 146. The scanner control system 146 includes scanner calibration logic 149 and a sensor validity table 153. The operating system 143 is executed to control the allocation and usage of hardware resources in the scanner. Specifically, the operating system 143 controls the allocation and usage of the memory 106 and processing time, etc. The scanner control system 146 is executed by the processor 106 to control the general operation of the scanner 100. In particular, the scanner control system 146 controls the activation of the drive motors 124, light sources 125, and other aspects of the scanner 100. According to an aspect of the present invention, the scanner calibration logic 149 is executed by the processor 103 to perform the calibration of the scanner 100. The specific details of the scanner calibration logic 149 are discussed in detail in the figures that follow.

Next a brief overview of the operation of the scanner 100 is provided. Assuming that a user wishes to scan a document or other media to create a digital copy, the document or other media is placed into a receiving slot of the scanner 100 as is generally known by those with ordinary skill in the art. The user then initiates the scan in a conventional manner by manipulating an input device, etc. The scanner control system 146 then controls the operation of the scanner drive components 123 including the drive motors 124, light sources 125, and other components in synchronization with the scanning function of the sensor array 129 to obtain the digital representation of the hard copy document. The digital information is then provided to a computer system 133 or other device by way of the I/O interface 119.

The scanning of the digital document is accomplished by repeatedly scanning "lines" of pixels from the digital document. To scan a line of pixels from the document, each of the light sources 125 is consecutively illuminated for a predetermined exposure time, thereby illuminating the document to be scanned. Note that the exposure time may be independently set for any time period desired and is altered more than once during the calibration of the scanner 100 as will be described. For each of the light sources 125, each of the sensors 131 absorbs the light reflected from the document and generates a sensor value therefrom. The sensor values are then read out of the sensor array 129 and accessed by the processor 103 via the sensor signal processing interface 116. Note that the sensor values are conditioned by sensor signal processing circuitry within the sensor signal processing interface 116 as will be discussed.

In order to scan the hard copy document to obtain a faithful digital reproduction, according to the present invention the scanner 100 is calibrated for optimal operation. To calibrate the scanner 100, the scanner calibration logic 149 is executed by the processor 103. The scanner calibration logic 149 may be executed before the scanning of each document or at user defined times based upon a predefined user input. Alternatively, the scanner calibration may be performed after predefined amount of scanner usage.

Regardless of when the scanner calibration logic 149 is executed, the execution thereof ensures the optimal operation of the scanner 100.

Figure 2:
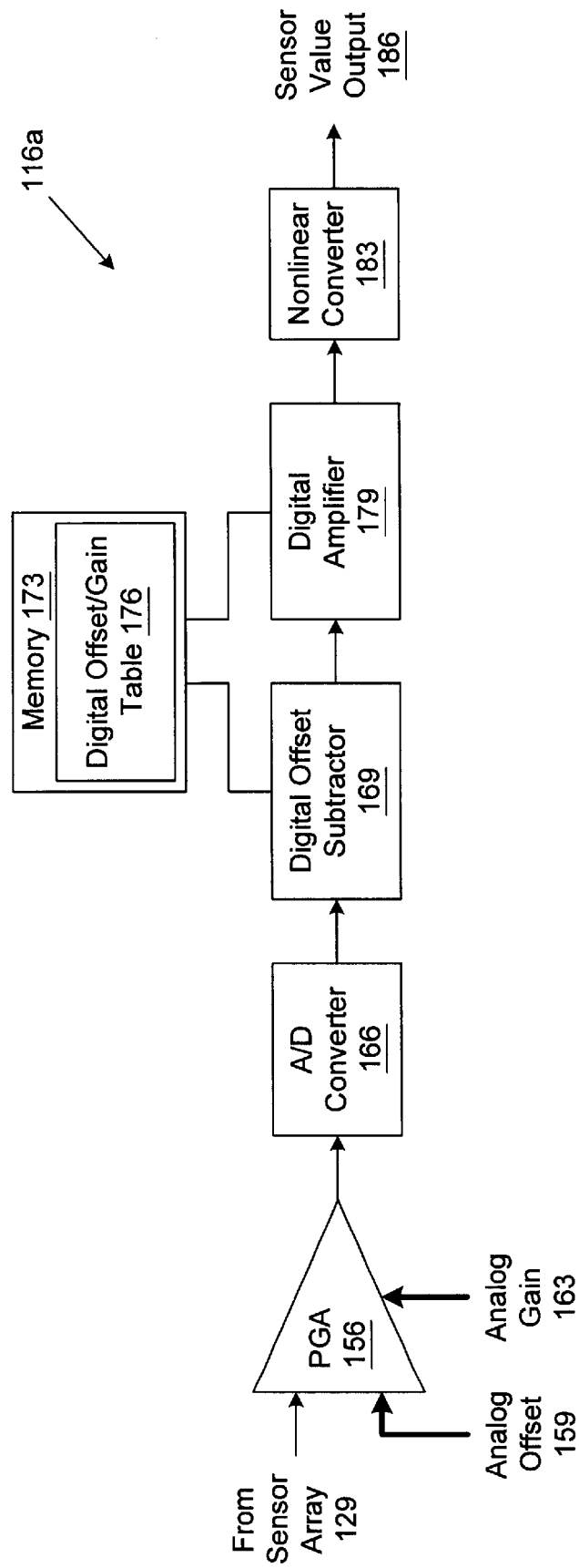
FIG. 2 is a functional block diagram of sensor signal processing circuitry that is manipulated by the scanner calibration logic in the scanning system of FIG. 1.

With reference then to FIG. 2, shown is a functional block diagram of the sensor signal processing circuitry 116a within the sensor signal processing interface 116. A discussion of the sensor signal processing circuitry 116a is provided to give context to the various functions performed during the execution of the scanner calibration logic 149 (FIG. 1). To begin, the sensor signal processing circuitry 116a receives a serial stream of sensor values from the sensors 131 (FIG. 1) in the sensor array 129 (FIG. 1). These values are applied to a programmable gain amplifier 156. The programmable gain amplifier 156 is employed to apply an analog offset 159 and an analog gain 163 to the sensor values.

Thereafter, the sensor values are applied to an analog-to-digital (A/D) converter 166 to convert the sensor values in digital form. The digital sensor values are then applied to a digital offset subtractor 169 that subtracts a digital offset from the digital values. Specifically, the sensor signal processing circuitry 116a includes a memory 173 within which is stored a digital offset/gain table 176. A sensor offset and a digital gain are maintained in the digital offset/gain table 176 for each of the sensors 131. After the digital offset is subtracted from the sensor values in the digital offset subtractor 169, the sensor values are applied to the digital amplifier 179 that amplifies the sensor values by the respective digital gains stored in the memory 173. Thereafter, the sensor values are applied to a nonlinear converter 183 that generates the sensor value output 186 that is applied to appropriate buffer circuitry and/or other circuitry to be accessed by the processor 103 (FIG. 1) through the local interface 109 (FIG. 1).

The sensor values that are generated by the individual sensors 131 in the sensor array 129 generally fall within a predetermined sensor output voltage range. This range may be, for example, 1.2 volts through 2 volts or other voltage window as is generally known by those with ordinary skill in the art. Unfortunately it is not always the case that the sensor values fall within this range. For example, due to degradation of the sensors 131 over time, some sensors may malfunction producing a continuous high or low voltage value. Others may provide a sensor value that is proportional to the intensity of the incident light, but the range may extend beyond the predefined sensor output range.

As a consequence, it is possible that one or more sensor values may be generated by one or more malfunctioning sensors 131 during the course of a scan that are clipped high and clipped low by the A/D converter 166. To address this problem, the analog offset 159 and the analog gain 163 are applied to the programmable gain amplifier 156 to ensure that all sensor values received from the sensors in the sensor array 129 fall within the input window of the A/D converter 166. Note however, that some sensors may not be able to produce a sensor value that falls within the input voltage range of the A/D converter 166 even with the application analog offset 159 and/or the analog gain 163. In such case, the present invention provides for the sensor validity table 153 that is employed to track malfunctioning sensors 131 and the sensor values that they generate are ignored.

Given that the output voltage range of the sensors 131 may vary from sensor to sensor, the present invention outlines an approach by which the minimum dark value and the maximum white value generated among all of the sensors in the sensor array 129 are identified. Once these values are known, the analog offset 159 and the analog gain 163 are set to ensure that all of the output voltage ranges of the sensors 131 fall within the input range of the A/D converter 166.

Figure 3:
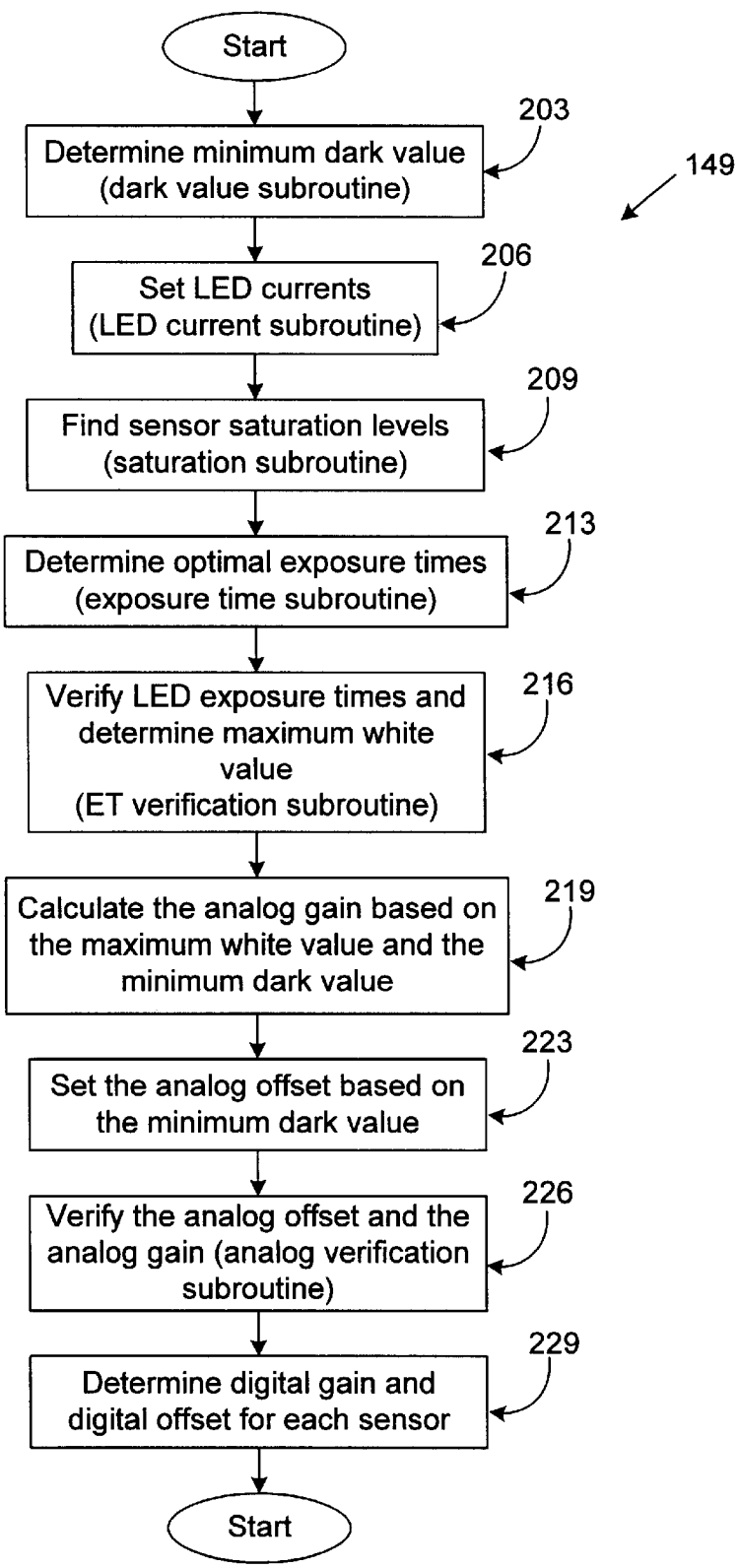
FIG. 3 is a flow chart of the scanner calibration logic of FIG. 1 according to an aspect of the present invention.

With reference to FIG. 3, shown is a flow chart of the scanner calibration logic 149 according to an embodiment of the present invention. Alternatively, the flow chart of FIG. 3 may be viewed as depicting the steps in a calibration method implemented in the scanner 100 (FIG. 1). The scanner calibration logic 149 is executed by the processor 103 (FIG. 1) to calibrate the operation of the sensor signal processing circuitry 116a (FIG. 2). The scanner calibration logic 149 ensures that the analog offset 159 and the analog gain 163 are set so as to obtain sensor values from the sensors 131 that represent valid and accurate imaging information. In addition, the scanner calibration logic 149 identifies any malfunctioning sensors 131 within the sensor array 129 and tracks them in the sensor validity table 153. This is done so that any malfunctioning sensors 131 may be ignored during a scanning operation, thereby eliminating undesirable abnormalities in the resulting image.

The scanner calibration logic 149 in FIG. 3 begins with block 203 in which a minimum dark value of all the dark sensor values generated by the sensors 131 (FIG. 1) is identified. The dark values represent those sensor values that are generated with no light from the light sources 125 (FIG. 1). To determine the minimum dark value, the scanner calibration logic 149 executes a dark value subroutine as will be discussed. Thereafter, the scanner calibration logic 149 moves to block 206 in which an amount of current that flows through the light sources 125 is determined. Assuming, for example, that the light sources 125 are light emitting diodes (LEDs), then the intensity of light that they generate may vary from light source to light source for a number of reasons. The scanner calibration logic 149 executes a "current subroutine" to determine and set the magnitude of the currents that flow through the respective light sources 125 to ensure that each generates light of a desired intensity. In order to set the magnitude of the currents that flow through each of the light sources 125, a current control circuit that drives each of the light sources 125 is controlled by the current subroutine as will be discussed.

Thereafter, in block 209 the scanner calibration logic 149 determines a saturation exposure time for each of the sensors 131 by executing a "saturation subroutine". Then, in block 213, an optimal exposure time is determined for each of the light sources by the execution of an "exposure time subroutine". The scanner calibration logic 149 then moves to block 216 in which the exposure times for each of the light sources 125 is verified and a maximum white value of all the maximum white sensor values is determined. This is accomplished with the execution of an exposure time verification subroutine that will be described.

Thereafter, in block 219 the scanner calibration logic 149 calculates the analog gain 163 based upon the maximum white value determined in block 216 and the minimum dark determined in block 203. In block 223, the analog offset is determined based upon the minimum dark value 203. Next, in block 226 the analog offset 159 and the analog gain 163 are verified and in block 229 a digital gain and a digital offset are determined for each of the sensors 131 and placed in the digital offset/gain table 176 (FIG. 2). The following discussion provides further detail on select ones of the above tasks performed by the scanner calibration logic 149.

Figure 4:
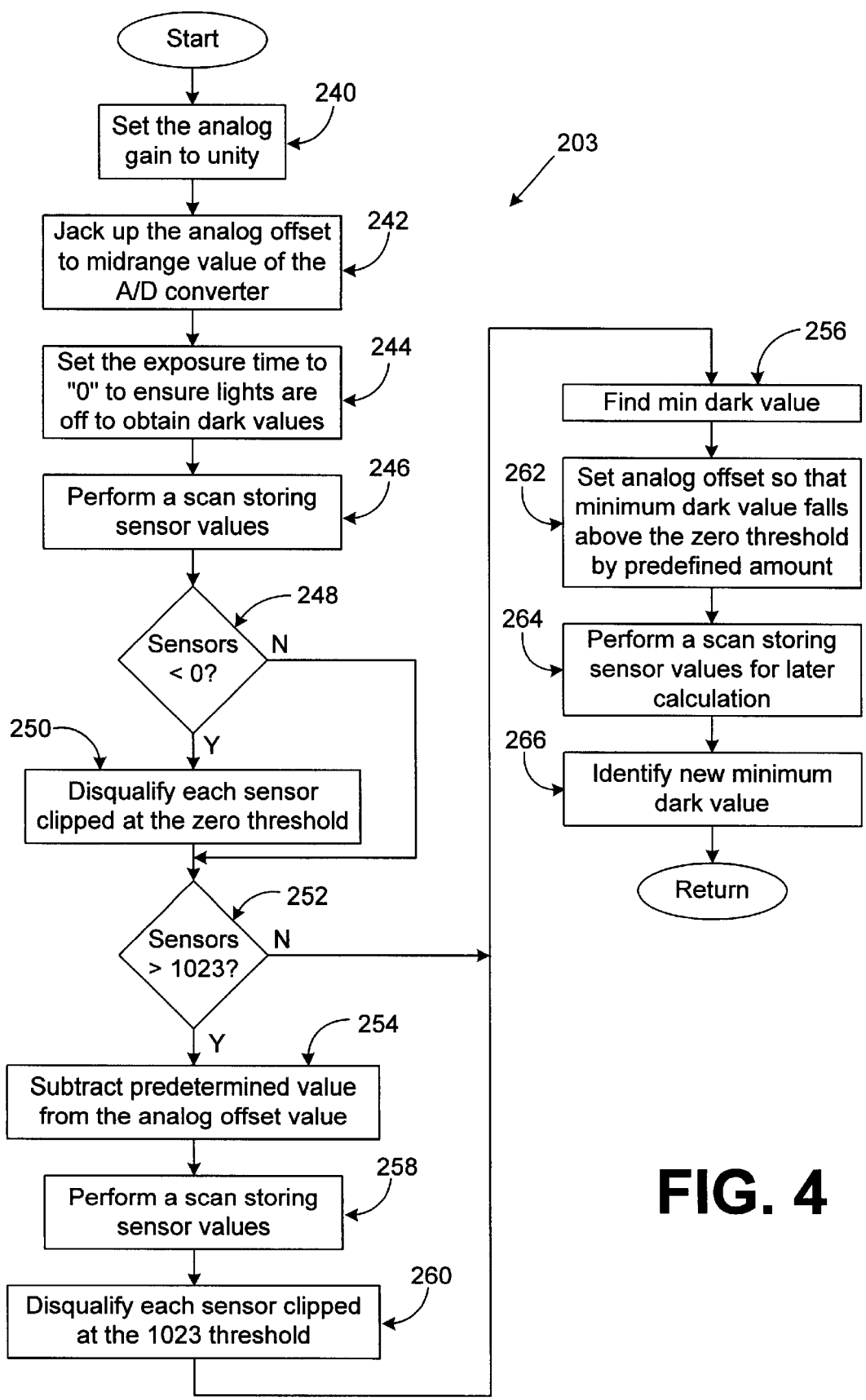
FIG. 4 is a flow chart of a portion of the scanner calibration logic of FIG. 3 executed to determine a minimum dark value of a number of sensors in a sensor array in the scanning system of FIG. 1.

Referring next to FIG. 4, shown is a flow chart of the dark value subroutine 203 that is executed to determine the minimum dark value out of all the dark values generated by the sensors 131 (FIG. 1) in the sensor array 129 (FIG. 1). Alternatively, the flow chart of FIG. 4 may be viewed as depicting steps in a method to determine the minimum dark value among all of the dark values generated by the sensors 131 of the sensor array 129.

Beginning with block 240, the dark value subroutine sets the analog gain 163 (FIG. 2) to unity. Next, in block 242 the analog offset is increased to a value that places the bottom of the operating voltage range of the sensors into the mid-region of the input voltage range of the A/D converter 166 (FIG. 2). This is done to ensure that all the dark values that are generated by the sensors 131 fall within the output voltage range of the A/D converter 166. Thereafter, in block 244 the exposure time of the light sources 125 (FIG. 1) is set to "0" to ensure that the light sources 125 are continually turned off to obtain dark values from the sensors 131 in the sensor array 129 (FIG. 1). Thereafter, in block 246 a scan of the sensors 131 is performed to obtain a dark value for each of these sensors 131 in the sensor array 129.

Next, in block 248, the dark value subroutine 203 ascertains whether the dark values of any of the sensors 131 are at or below the bottom value of the output range of the A/D converter 166. The bottom value may be, for example, zero or other value. If such is the case then the dark value subroutine 203 moves to block 250 in which each sensor 131 that has been clipped at the bottom of the output range of the A/D converter 166 is disqualified from further calculations and from further use in image generation. This is accomplished by placing an appropriate value in a register in the sensor validity table 153 that corresponds with the particular sensor in question indicating that the respective sensor 131 is invalid. The dark value subroutine 203 then proceeds to block 252 as shown. However, assuming that no dark values from any of the sensors 131 fall below the bottom of the output range of the A/D converter 166, then the dark value subroutine 203 moves directly to block 252.

In block 252, the dark value subroutine 203 determines whether any of the dark values obtained from any of the sensors 131 in the sensor array 129 are greater than or equal to the upper limit of the output range of the A/D converter 166. The upper limit may be a value of 1023, for example, assuming ten bit parallel output bus, although other values may be employed. If so then the dark value subroutine 203 progresses to block 254. Otherwise, the dark value subroutine 203 jumps to block 256. Assuming that the dark value subroutine 203 has proceeded to block 254, then at least one of the dark values from the sensors in the sensor array 129 has produced a dark value that falls at or above the upper limit of the operating output range of the A/D converter 166. Consequently, the sensor array 131 is further checked to determine whether the errant sensors 131 can produce valid sensor values.

To do so, in block 254 a predetermined value is subtracted from the analog offset 159 (FIG. 2). Thereafter, in block 258 a scan is performed obtaining new dark values from each one of the sensors 131, the new dark values being stored in the memory 106. Thereafter, in block 260 each sensor 131 that produces a dark value that is still above the upper limit of the operating output range of the A/D converter 166 is disqualified in the sensor validity table 153.

In block 256 the dark value subroutine 203 determines which of the dark values from all of the remaining qualified sensors 131 is the minimum dark value. Thereafter, in block 262, the analog offset 159 is set to a value that causes the minimum dark value to fall just above the lower limit of the operating output range of the A/D converter 166 by a predefined amount. Thereafter, in block 264, a scan is performed of the sensors 131 and the sensor values obtained therefrom are stored for later calculation. Thereafter, in blocks 266, the new minimum dark value from these sensor values is determined and stored in the memory 106 (FIG. 1). Thereafter the dark value subroutine 203 ends as shown.

Figure 5:
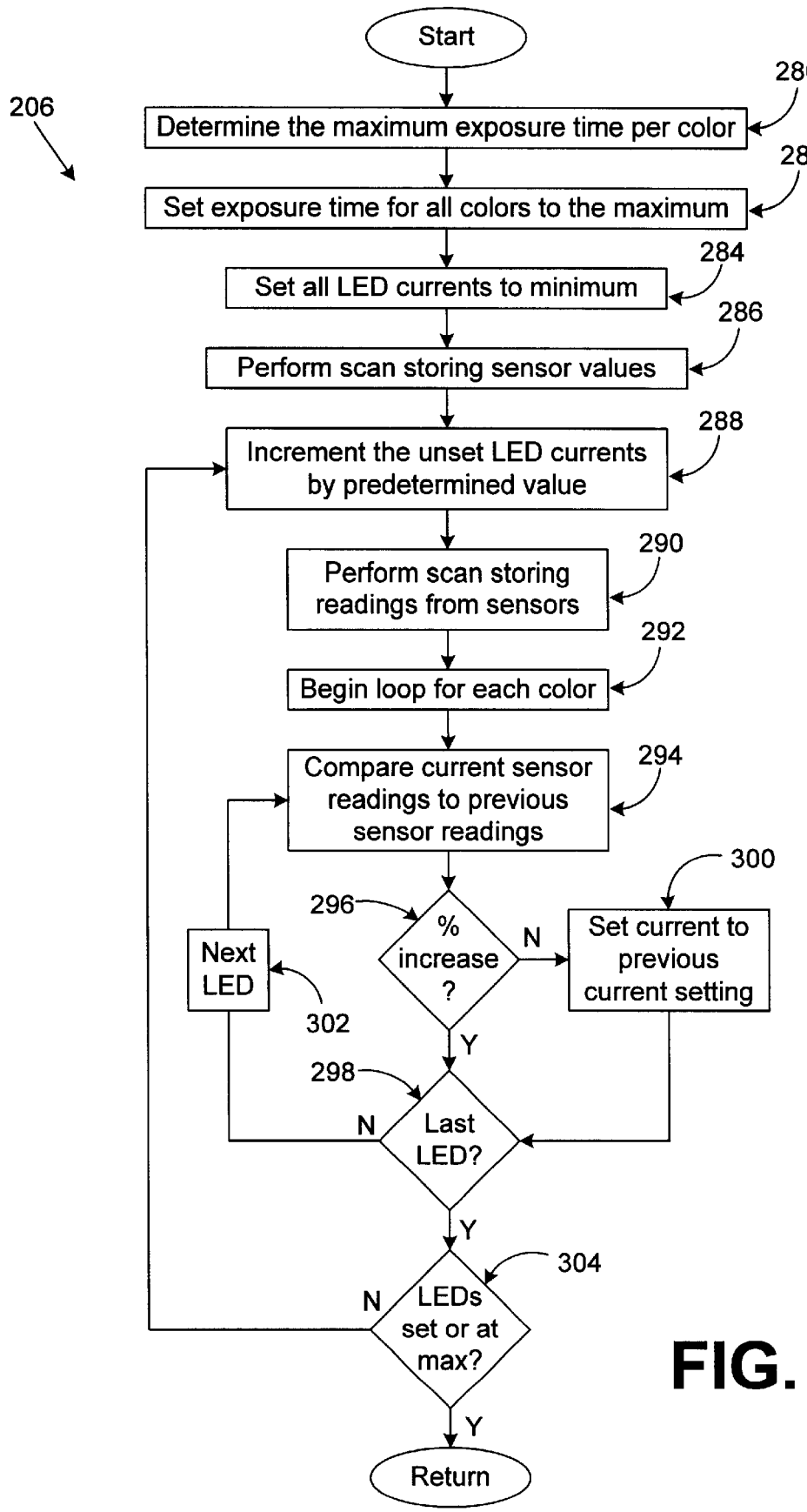
FIG. 5 is a flow chart of a portion of the scanner calibration logic of FIG. 3 executed to determine the current that is applied to the light sources of the scanning system of FIG. 1.

Turning then to FIG. 5, shown is a flow chart depicting the current subroutine 206 that is executed in conjunction with the scanner calibration logic 149 (FIG. 3) to determine an optimum current that is to flow through each of the light sources 125 (FIG. 1) that may be light emitting diodes or other light sources. The current subroutine 206 is included to control the current flowing through the light sources insofar as the intensity of the light that is created thereby varies with the amount of current flowing therethrough.

Beginning with block 280, the current subroutine 206 first determines the maximum exposure time for each colored light source 125 employed in the scanner 100. Note that the maximum exposure time may depend upon various factors including the speed at which the document progresses through the scanner 100 (FIG. 1) and the resolution of the sensors 131 (FIG. 1) employed to obtain the images from the document, etc. Thereafter, in block 282, the exposure time for each of the light sources 125 is set to the maximum allowable. This may be, for example, one third of the total time allotted to acquire a single line of pixels in a document as all color information is often acquired for a single row of pixels as is generally owned by those with ordinary skill in the art.

Thereafter, in block 284 the magnitude of the current that flows through the respective light sources is set to a minimum value generated by an accompanying current control circuit in the scanner 100 such as the current control circuit discussed in U.S. patent application entitled "System and Method for Illuminating Light Emitting Diodes in a Contact Image Sensor" assigned Ser. No. 09/776,069 filed on Feb. 2, 2001. Then, the current subroutine 206 moves to block 286 in which a scan of the sensors 131 is performed and the sensor values obtained therefrom are stored in the memory 106. Thereafter, in block 288, all of the currents that flow through the respective light sources 125 that are not set to a finalized value are incremented by a predetermined amount by manipulating the current control circuit. Note that the first time that block 288 is encountered, all of the light emitting diode currents will not be set to a final value as the optimal current level for each has yet to be determined.

The current subroutine 206 then proceeds to block 290 in which a scan is performed of the sensors 131 and the corresponding sensor values are stored in the memory 106. Note that the newly determined current values from block 288 are applied to the light sources during the scan performed in block 290. Thereafter, in block 292 a loop is begun for each light source.

In block 294, the current sensor values are compared to the previous sensor values to determine whether the new values are greater than the previous values by a predetermined percentage increase. Thereafter, in block 296, if the current sensor values are greater than the prior sensor values by the predetermined percent increase, then the current subroutine 206 proceeds to block 298. On the other hand, if the percent increase has not been achieved in block 296, then the current subroutine 206 proceeds to block 300 in which the current for the present light emitting diode is set to the previous setting. Thereafter the current subroutine 206 progresses to block 298. In block 298, it is determined whether the comparison of block 294 has been performed for all of the light sources. If not, then the current subroutine 206 proceeds to block 302 in which the next light source is identified. Otherwise, the current subroutine 206 proceeds to block 304. Once the next light source is identified in block 302, then the current subroutine 206 reverts back to block 294.

In block 304, the current subroutine 206 determines whether all of the currents for each of the light emitting diodes and their corresponding colors has been set in block 300, or are at the maximum allowed current. If not, then the current subroutine 206 reverts back to block 288. Otherwise, the current subroutine 206 ends.

Thus, the current subroutine 206 establishes the optimum current to flow through the respective light sources by starting at a low current value and increasing the currents in steps until a saturation of the sensors 131 is detected. Note that the percent increase that is compared with respect to block 296 may be, for example, eight percent or other value.

Alternatively, a different approach in which the currents applied to the sensors 131 are decremented. For example, initially in block 284, the currents may be set to a minimum and the unset currents may be decremented in block 288. In such case, in block 296, the current subroutine 206 would detect a predefined percent decrease that indicates the saturation point of the sensors 131 has been reached.

Figure 6:
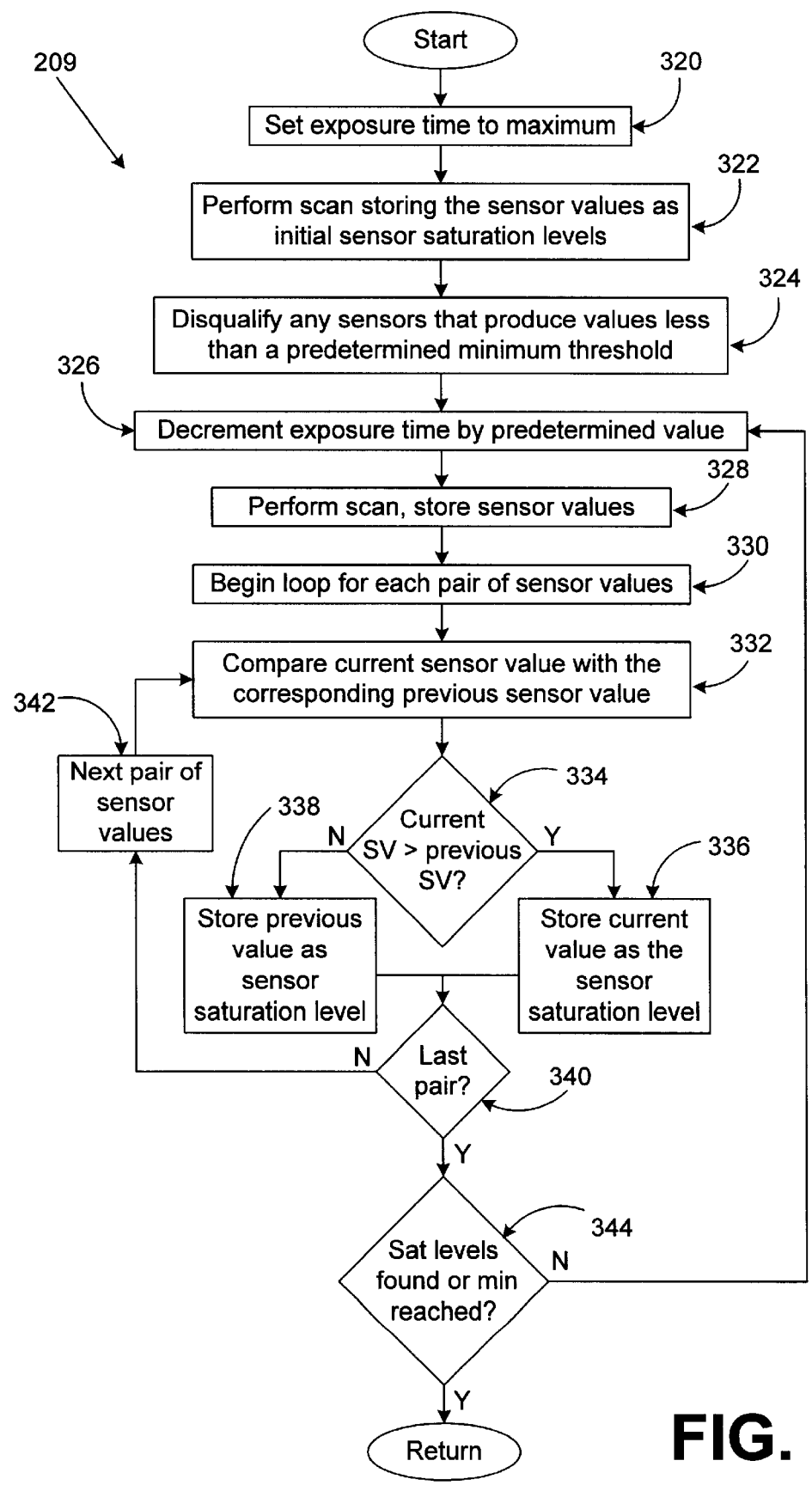
FIG. 6 is a flow chart of a portion of the scanner calibration logic of FIG. 3 executed to determine a saturation exposure time of the sensors in a sensor array in the scanning system of FIG. 1.

Turning to FIG. 6, shown is a flow chart of a saturation subroutine 209 that is employed to find the sensor saturation level of each of the sensors 131 (FIG. 1) of the sensor array 129 (FIG. 1). Alternatively, the flow chart of FIG. 6 may be viewed as depicting steps in a method for determining the sensor saturation levels of the sensors 131. For each of the sensors 131 in the sensor array 129, there are three different saturation levels, one for each colored light source 125 (FIG. 1). The saturation subroutine 209 is executed to determine the exposure time at which most or all of the sensors 131 are near saturation, but not actually in a saturated condition. Beginning with block 320, the exposure time for the light sources 125 is set to a maximum possible value as may be determined by one with ordinary skill in the art. This may be determined, for example, by examining the speed at which a scanned document progresses through the scanner 100 (FIG. 1) to determine the maximum amount of time that each of the light sources 125 can be illuminated.

"Next, in block 322, a scan of the sensors 129 is performed at the maximum exposure time and an initial set of sensor values obtained therefrom is stored in the memory 106 (FIG. 1). Then, in block 324, any of the sensors that produce sensor values that are less than a predetermined minimum threshold are disqualified from further operation in the sensor validity table 153 (FIG. 1). This is because at the maximum exposure time, all of the sensors 131 within the sensor array 129 should produce sensor values of appreciable magnitude. Those sensors 131 that do not produce such a sensor value are presumed to be malfunctioning. Next, in block 326 the exposure time is reduced by a predetermined value. Thereafter, in block 328 another scan of the sensors 131 is performed and the sensor values obtained therefrom are stored in the memory 106. Then, in block 330 a loop is executed for each of the sensors 131. Thereafter in block 332, the most recent sensor value obtained for the current sensor 131 is compared with the second most recent sensor value obtained from the same sensor 131."

In block 334, if the most recent sensor value is greater than the second most recent sensor value for a particular sensor, then the saturation subroutine 209 progresses to block 336. Otherwise the saturation subroutine 209 moves to block 338. In block 336, the most recent sensor value obtained for the current sensor is stored as the sensor saturation level. Thereafter the saturation subroutine 209 proceeds to block 340. On the other hand, in block 338, the second most recent sensor value is stored as the sensor saturation level. Thereafter the saturation subroutine 209 proceeds to block 340. In block 340, it is determined whether the last pair of sensor values has been compared, given that there are three different colors to compare for each sensor within the sensor array 129. Assuming that more pairs of sensor values remain to be analyzed in block 340, then the saturation subroutine 209 proceeds to block 342 in which the next pair is identified. Thereafter, the saturation subroutine 209 reverts back to block 332.

However, if in block 340 it is determined that the last pair of sensor values has been analyzed, then the saturation subroutine 209 proceeds to block 344. In block 344 it is determined whether the final saturation levels have been determined for all of the sensors 131 in the sensor array 129 or if minimum exposure time values have been reached. The final saturation levels are determined when the second most recent sensor values are stored as the saturation levels in block 338. This is because a subsequent sensor reading at a lower exposure time did not change the saturation level itself. The minimum exposure time detected in block 344 is a predetermined value that is ascertained based upon what should be a minimum exposure time for the saturation levels to be obtained by the sensors 131. If either condition is true in block 344, then the saturation subroutine 209 ends. However, if not, then the saturation subroutine 209 reverts back to block 326. Thus, the saturation subroutine 209 obtains an estimate of the exposure time at which each of the sensors 129 is saturated for each individual color. This information is employed to obtain the optimum exposure time as will be discussed.

Figure 7A:
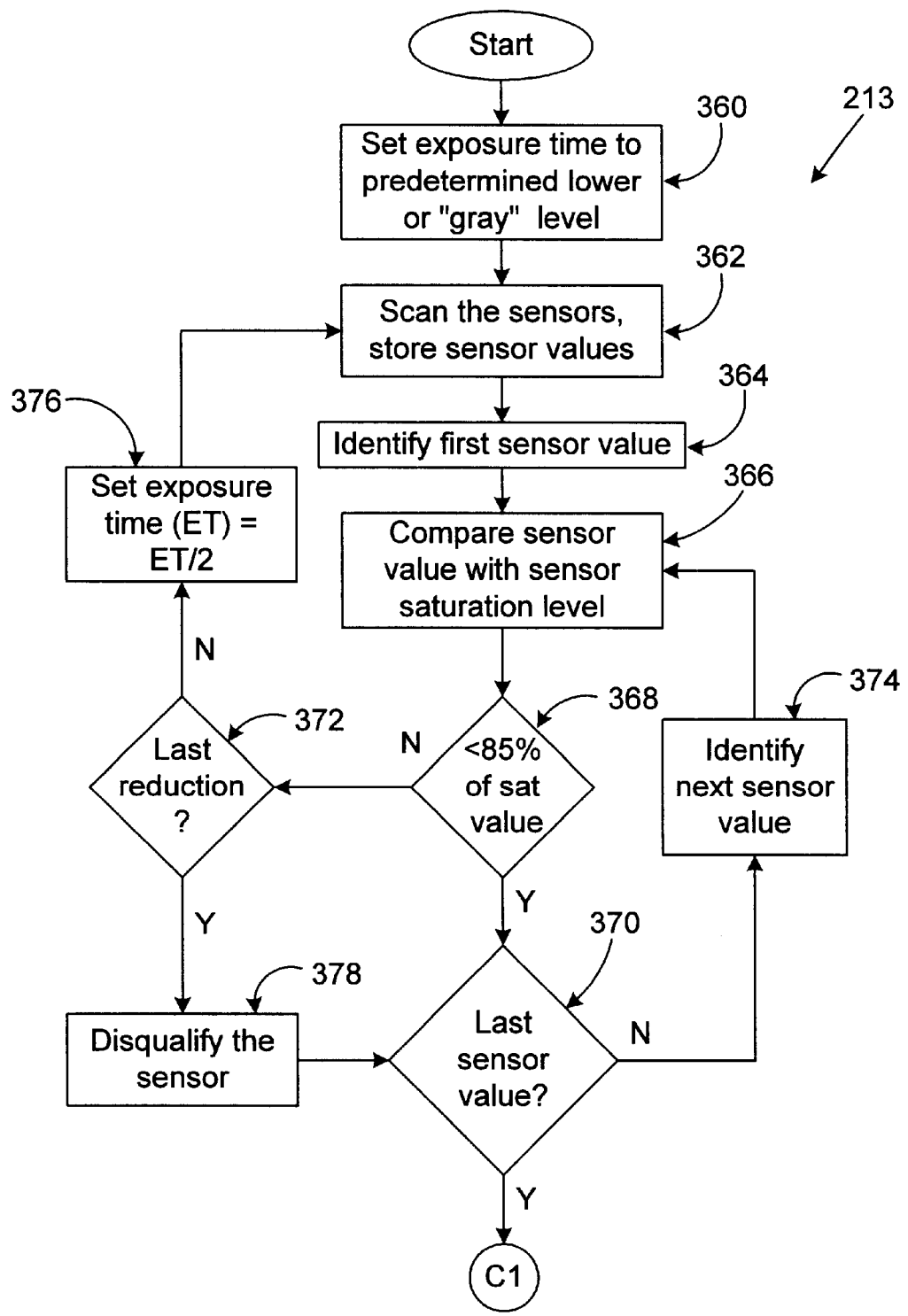
FIGS. 7A and 7B are a flow chart of a portion of the scanner calibration logic of FIG. 3 executed to determine an operating exposure time of the sensors in a sensor array in the scanning system of FIG. 1.
Figure 7B:
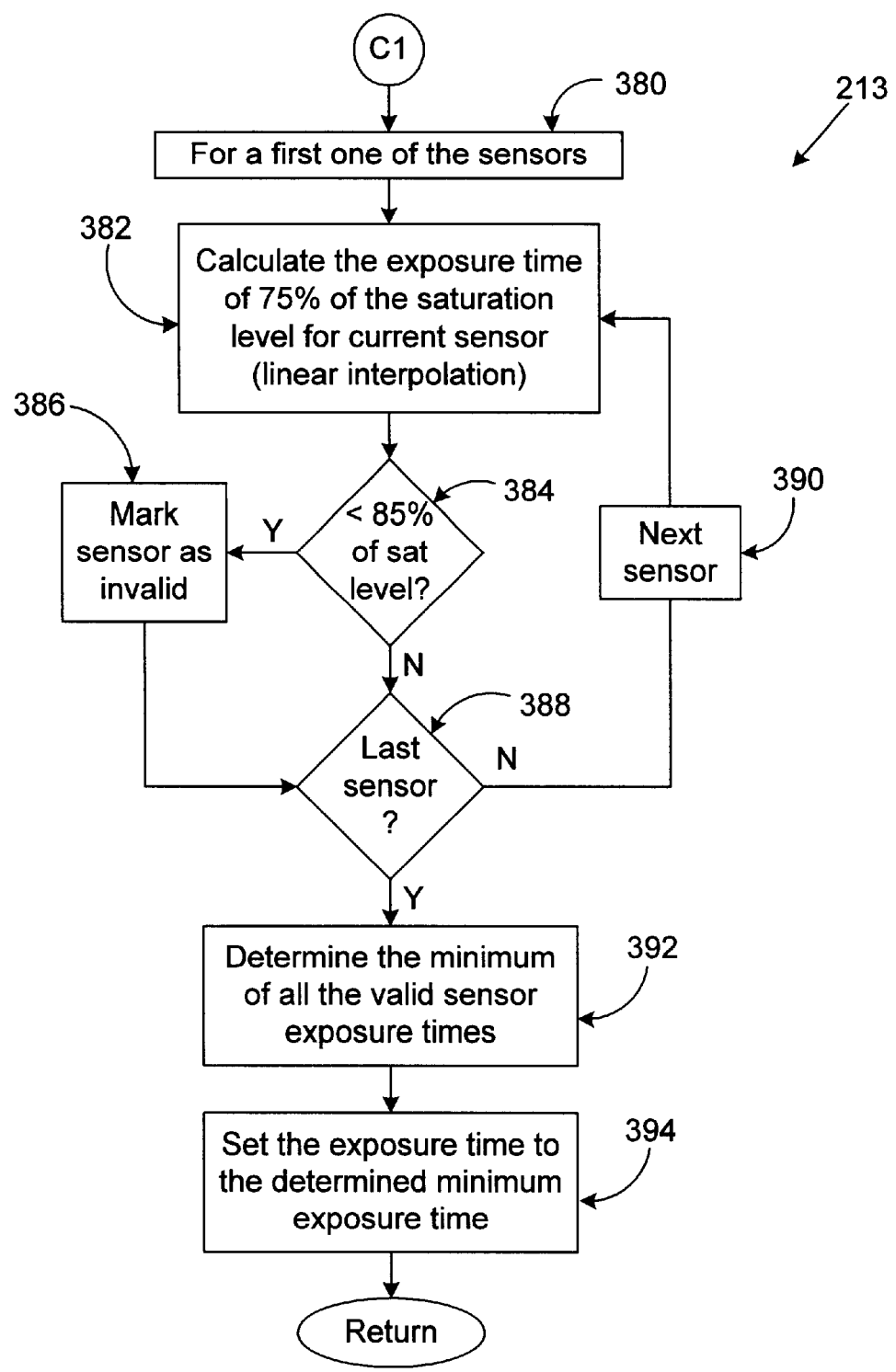

With reference to FIGS. 7A and 7B, shown is a flow chart of an exposure time subroutine 213 that is executed to determine the optimal exposure times of the sensors 131 (FIG. 1) in block 213 (FIG. 3). Alternatively, the flow chart of FIGS. 7A and 7B may be viewed as depicting the steps in a method for determining an optimal exposure time of the sensors 131. The exposure time subroutine determines the optimal exposure times of the sensors 131 by repeatedly reducing the exposure time and scanning the sensors 131 to arrive at sensor values that are at least a predetermined percentage below the saturation level for each sensor 131.

Referring to FIG. 7A, in block 360 the exposure time for the light sources 125 is set to a "gray" exposure time. The gray exposure time is somewhere between the maximum possible exposure time and a minimum exposure time of zero. Once the exposure time is set to the gray exposure time in block 360, the exposure time subroutine 213 proceeds to block 362 in which the sensors in the sensor array 129 are scanned and the resulting sensor values are stored in the memory 106 (FIG. 1).

Thereafter the exposure time subroutine 213 proceeds to block 364 in which a first sensor value is identified among the sensor values stored in block 362. In block 366 the current sensor value identified is compared with the sensor saturation level for the particular sensor for the corresponding color. Then, in block 368 it is determined whether the sensor value is less than the sensor saturation level by at least a predetermined amount. The predetermined amount may be, for example, fifteen percent of the sensor saturation level or other number as is appropriate. If such is the case, then the exposure time subroutine 213 proceeds to block 370. Otherwise, the exposure time subroutine 213 proceeds to block 372.

In block 370 it is determined whether the last sensor value stored in block 362 has been compared with the corresponding sensor saturation level for the particular sensor of the sensor array 129. If not, then the exposure time subroutine 213 proceeds to block 374 in which the next sensor value stored in the memory 106 is identified. Thereafter the exposure time subroutine 213 reverts back to block 366. On the other hand, if it is determined in block 370 that the last sensor value has been evaluated, then the exposure time subroutine 213 proceeds to the connector C1 as shown.

Assuming that the exposure time subroutine 213 has proceeded to block 372, then it is determined whether the exposure time has experienced a predetermined number of reductions from the original gray exposure time ascertained in block 360. In essence, the exposure time subroutine 213 only reduces this value by a predetermined number of times to obtain sensor values that are at least fifteen percent or other predetermined value lower than the corresponding sensor saturation level.

In block 372, the exposure time subroutine 213 determines whether the last reduction of the exposure time has occurred. If not then the exposure time subroutine 213 proceeds to block 376. Otherwise the exposure time subroutine 213 proceeds to block 378. In block 376, the exposure time is reduced, for example, by dividing it by two. Note that this reduction may be accomplished in another manner, for example, by decrementing the exposure time by a specific amount, dividing by a number other than two, or by some other approach. After block 376, the exposure time subroutine 213 reverts back to block 362 in which the sensors 131 of the sensor array 129 are scanned once again.

Assuming that the exposure time subroutine 213 proceeds to block 378, then the final reduction of the exposure time has occurred and the sensor value of the current sensor under consideration still remains above the predetermined threshold of fifteen percent below the sensor saturation level. In block 378, this sensor is disqualified as it is assumed to be malfunctioning. Thereafter, the exposure time subroutine 213 proceeds to block 370.

With reference to FIG. 7B, shown is a second portion of the exposure time subroutine 213. In FIG. 7B, the exposure time subroutine 213 moves from block 370 (FIG. 7a) to block 380 in which a first one of the sensors 131 (FIG. 1) is identified to calculate a new exposure time based on both the saturation exposure time and the exposure time determined by the exposure time subroutine 213 in FIG. 7A. Thereafter, in block 382, the exposure time subroutine 213 calculates an exposure time that is 75% or other percentage of the saturation exposure time for the current sensor. This may be done using linear interpolation given the saturation exposure time and sensor value in addition to the gray level exposure time and corresponding sensor value.

In block 384, the exposure time subroutine 213 determines whether the interpolated exposure time is less than at least 85% or other predefined percentage of the saturation exposure time for the current sensor 131. If such is the case then the exposure time subroutine 213 proceeds to block 386. Otherwise the exposure time subroutine 213 progresses to block 388. In block 386, the current sensor 131 is disqualified as it is presumably malfunctioning due to the fact that the interpolated exposure time is greater than the predetermined percentage of 85% or other value of the saturation exposure time.

Thereafter, the exposure time subroutine 213 proceeds to block 388 as shown. In block 388, it is determined whether the interpolated exposure time has been determined for the last one of the sensors 131 in the sensor array 129. If not, then the exposure time subroutine 213 moves to block 390 in which the next sensor 131 in the sensor array 129 is identified. Thereafter, the exposure time subroutine 213 reverts back to block 382.

Assuming that an interpolated exposure time has been determined for the last sensor 131 in block 388, then the exposure time subroutine 213 proceeds to block 392 in which the minimum sensor exposure time for all of the qualified sensors 131 of the sensor array 129 is determined. Thereafter, the exposure time subroutine 213 proceeds to block 394 in which the exposure time to be employed for the sensor array 129 in future operation of the scanner 100 (FIG. 1) is set to the minimum exposure time identified in block 392. Thereafter the exposure time subroutine 213 ends.

Figure 8:
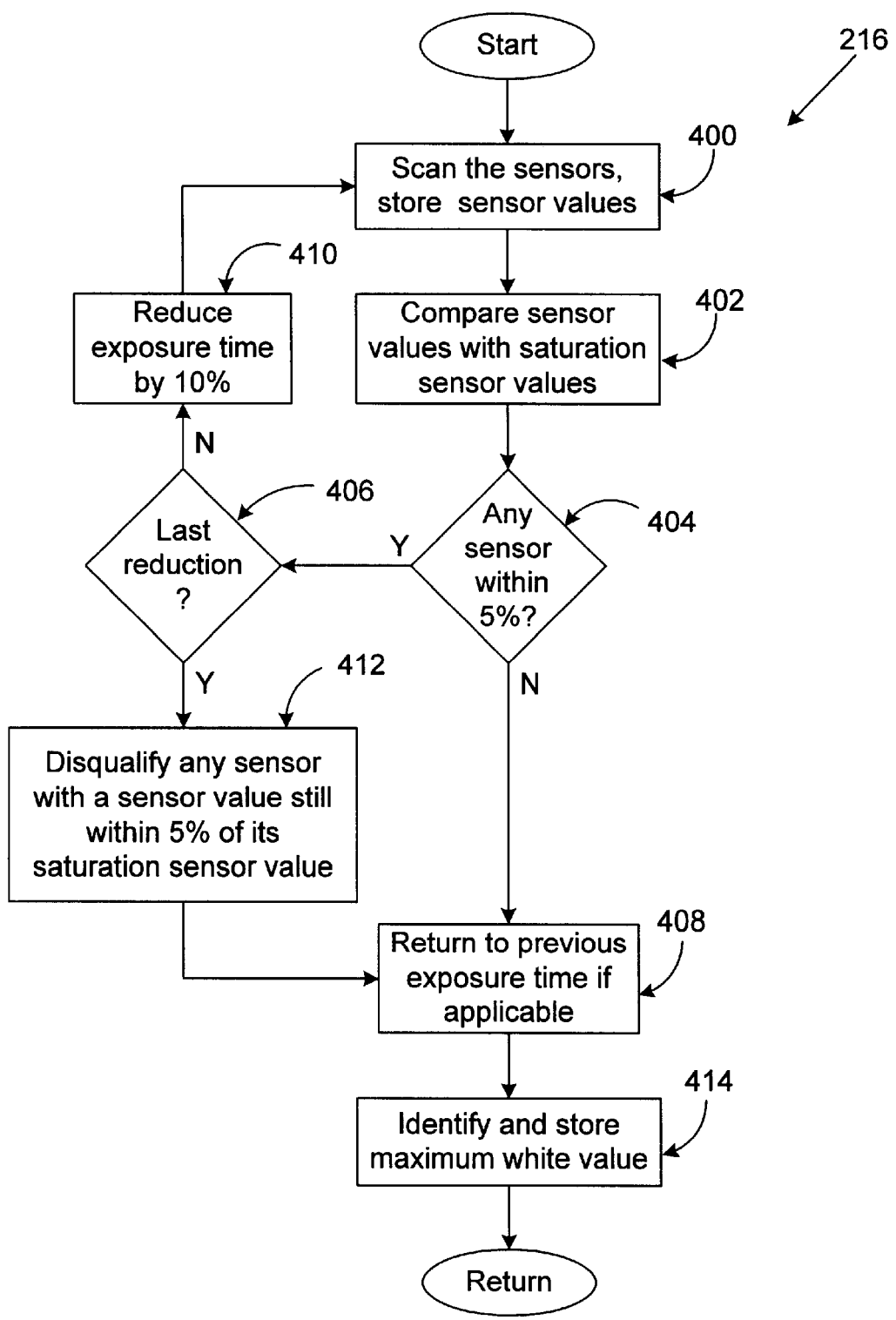
FIG. 8 is a portion of the scanner calibration logic of FIG. 3 executed to verify the operating exposure time and determine a maximum white value generated by a particular sensor in the sensor array in the scanning system of FIG. 1.

With reference to FIG. 8, shown is a flow chart of an exposure time verification subroutine 216 that is executed by the scanner calibration logic 149 to verify the exposure time determined in the exposure time subroutine 213 (FIGS. 7A and 7B). Alternatively, the flow chart of FIG. 8 may be viewed as depicting a number of steps in a method to verify the exposure time determined in the method of FIGS. 7A and 7B. The exposure time verification subroutine 216 generally obtains sensor values from the sensors 131 (FIG. 1) at the optimum exposure time determined by the exposure time subroutine 213. The verification is performed by ensuring that none of the sensor values obtained at the optimum exposure time are within 5% or other percentage of the respective saturation sensor value for the corresponding sensor 131 in the sensor array 129 (FIG. 1). Those sensors 131 that continually generate sensor values that fall within 5% of the respective saturation sensor value are disqualified accordingly.

Beginning with block 400, the exposure time verification subroutine 216 scans the sensors 131 in the sensor array 129 and stores the corresponding sensor values in the memory 106 (FIG. 1). Thereafter, in block 402 the sensor values obtained in block 400 are compared with the corresponding saturation sensor values for each of the sensors 131 in the sensor array 129. In particular, there are three different sensor values for each of the sensors 131 that are compared with three corresponding saturation sensor values corresponding to the three color channels of the scanner 100 (FIG. 1).

Then, in block 404, the exposure time verification subroutine 216 determines whether any of the sensor values are within a predetermined percentage of the saturation sensor values. The predetermined percentage may be, for example, 5% or other percentage. If such is the case then the exposure time verification subroutine 216 proceeds to block 406. Otherwise, the exposure time verification subroutine 216 proceeds to block 408. In block 406, the exposure time verification subroutine 216 determines whether the exposure time has been reduced a predetermined number of times within the exposure time subroutine 216. Specifically, the exposure time is to be reduced from the optimum exposure time by a predetermined number of times in an attempt to ensure that all sensor values obtained in the scans of block 400 fall below 5% of the corresponding saturation sensor value. In block 406, if the last reduction has not previously taken place, then the exposure time verification subroutine 216 proceeds to block 410 in which the exposure time is reduced by a predetermined percentage of its current value. This predetermined percentage may be, for example, 10% or other value. Thereafter, the exposure time verification subroutine 216 reverts back to block 400.

Assuming that however that the last reduction has taken place in block 406, then the exposure time verification subroutine 216 proceeds to block 412. In block 412 any sensor 131 that still produces a sensor value that is within five percent of its corresponding saturation sensor value is disqualified as presumably such sensors 131 are malfunctioning. Thereafter, the exposure time verification subroutine 216 moves to block 408. In block 408, the exposure time is set at the previous exposure time before the most current reduction has occurred in block 410. If no reduction has occurred when the exposure time verification subroutine 216 reaches block 408, then the initial exposure time employed in block 400 is retained. Thereafter, the exposure time verification subroutine 216 proceeds to block 414 in which the maximum white value of all of the sensor values is determined. This may be accomplished, for example, by illuminating a white scan target and performing a scan of the sensors 131 to obtain the white values from the sensors 131. Thereafter, the maximum white value may be identified. Thereafter the exposure time verification subroutine 216 ends.

Figure 9A:
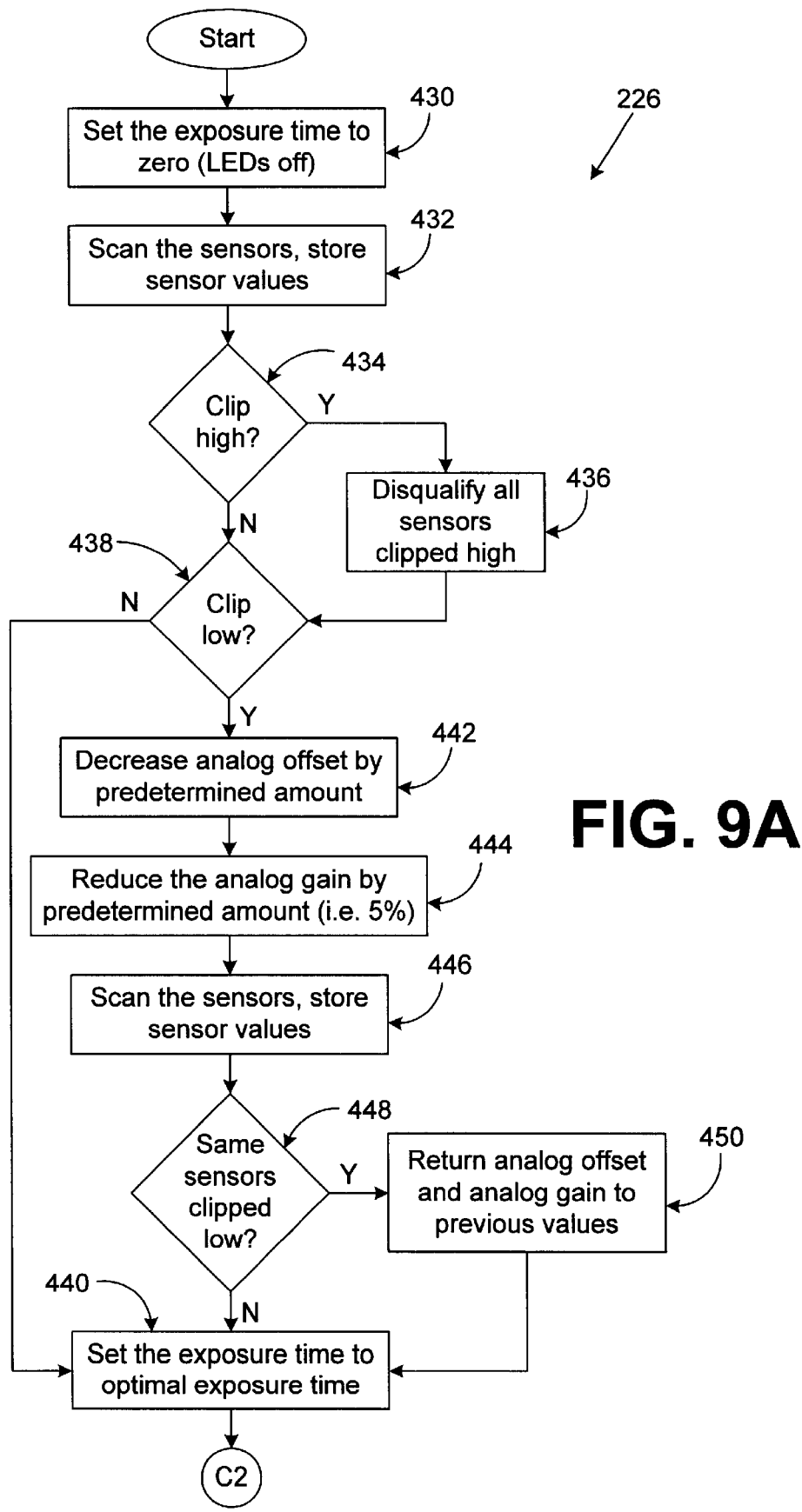
FIGS. 9A and 9B are a flow chart of a portion of the scanner calibration logic of FIG. 3 executed to verify an analog offset and an analog gain employed in the sensor signal processing circuitry depicted in FIG. 2.
Figure 9B:
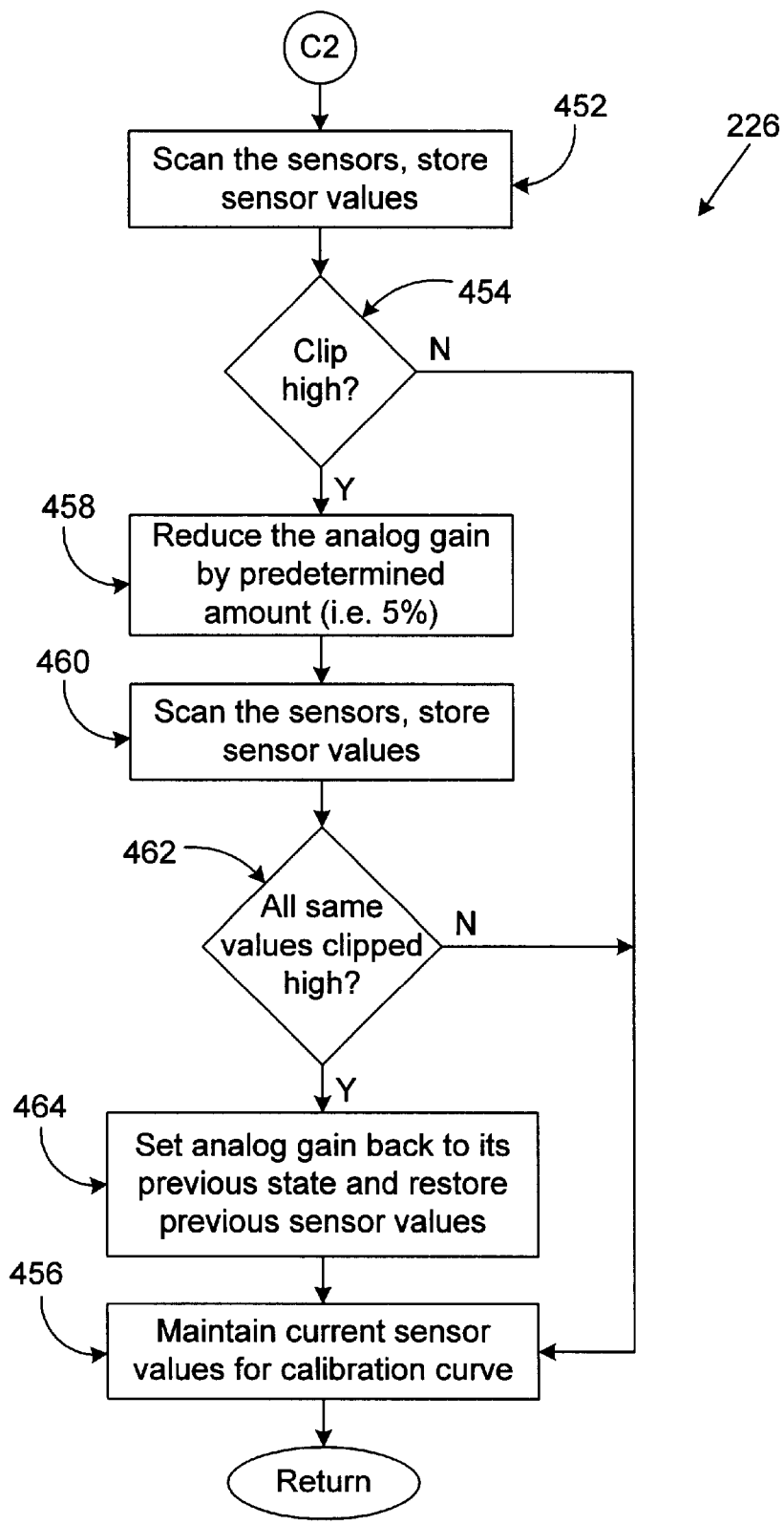

With reference to FIGS. 9A and 9B, shown is a flow chart of the analog verification subroutine 226 that is executed by the scanner calibration logic 149 to verify the analog offset 159 (FIG. 2) and the analog gain 163 (FIG. 2) applied to the programmable gain amplifier 156 (FIG. 2). Alternatively, the flow chart of FIGS. 9A and 9B may be viewed as depicting the steps of a method executed in the scanner 100 (FIG. 1) in order to verify the values of the analog offset 159 and the analog gain 163. Beginning with block 430, the exposure time of the scanner 100 is set to zero to obtain dark values from the sensors 131 (FIG. 1) in the sensor array 129 (FIG. 1). Thereafter, the analog verification subroutine 226 proceeds to block 432 in which the sensors 131 are scanned and the sensor values obtained therefrom are stored in the memory 106 (FIG. 1).

Next, in block 434 the analog verification subroutine 226 determines whether any of the sensor values stored in the memory 106 were "clipped high" as the values generated by the corresponding sensors 131 fell below the minimum threshold of the output of the A/D converter 166. This condition exists if the lowest value generated at the output of the A/D converter 166 is seen for a particular sensor value. Assuming that at least one of the sensor values has been clipped high in block 434, then the analog verification subroutine 226 proceeds to block 436 in which all of the sensors 131 that generated sensor values that were clipped high in block 434 are disqualified in the sensor validity table 153 (FIG. 1). If none of the sensor values generated by the sensors 131 in block 432 are clipped high as determined in block 434, then the analog verification subroutine 226 proceeds to block 438. Likewise, after block 436, the analog verification subroutine 226 also proceeds to block 438.

In block 438 the analog verification subroutine 226 determines whether any of the sensor values obtained in block 432 have been "clipped low" such that they fall above the upper limit of the output of the A/D converter 166. This condition exists if the highest value generated at the output of the A/D converter 166 is seen for a particular sensor value. If not, then the analog verification subroutine 226 skips to block 440. Otherwise the analog verification subroutine 226 proceeds to block 442. In block 442, the analog offset 159 is decreased by a predetermined amount that presumably causes any valid sensors that have been clipped low with respective lock 438 to fall within the operating range of the A/D converter 166. Thereafter, the analog gain 163 is reduced by a predetermined amount such as, for example, 5% or other percentage of the original analog gain 163.

Next, the analog verification subroutine 226 proceeds to block 446 in which the sensors 131 of the sensor array 129 are scanned and the sensor values obtained therefrom are stored in the memory 106. The analog verification subroutine 226 then proceeds to block 448 in which it is determined whether the same sensors 131 that produce sensor values that were clipped low with respect to block 438 continue to be clipped low. If so, then the analog verification subroutine 226 proceeds to block 450 in which the analog offset 159 and the analog gain 163 are returned to their previous values. On the other hand, if the same sensors are not clipped low in block 448, then the analog verification subroutine 226 proceeds to block 440. Likewise, after block 450, the analog verification subroutine 226 also proceeds to block 440. In block 440 the exposure time of the scanner 100 is set to the optimal exposure time determined by the exposure time verification subroutine 216 (FIG. 8).

Thereafter, with reference to FIG. 9B the analog verification subroutine 226 proceeds to block 452 in which the sensors 131 of the sensor array 129 are scanned and the sensor values generated therefrom are stored in the memory 106 (FIG. 1). Thereafter, in block 454, the analog verification subroutine 226 determines whether any of the sensor values have been clipped high by the A/D converter 166. If not then the analog verification subroutine 226 proceeds to block 456 in which the current sensor values are maintained in the memory 106 to generate a calibration curve therefrom.

On the other hand, if sensor values are clipped high in block 454, then the analog verification subroutine 226 proceeds to block 458 in which the analog gain 163 is reduced by a predetermined amount such as, for example, 5% or some other percentage. Thereafter, in block 460, the sensors 131 in the sensor array 129 are scanned and the values generated therefrom are stored in the memory 106. Next, in block 462 the analog verification subroutine 226 determines whether all of the same values clipped high in block 454 continue to be clipped high. If not then the analog verification subroutine 226 jumps to block 456. Otherwise, in block 464 the analog gain 163 (FIG. 2) is set back to its previous state and the previous sensor values are restored. Thereafter, the analog verification subroutine 226 proceeds to block 456. In block 456 the current sensor values are stored in the memory 106 so that they may be accessed to generate a later calibration curve. Thereafter, the analog verification subroutine 226 ends.

Although the scanner calibration logic 149 (FIG. 1) of the present invention is embodied in software executed by general purpose hardware as discussed above, as an alternative the scanner calibration logic 149 may also be embodied in dedicated hardware or a combination of software/general purpose hardware and dedicated hardware. If embodied in dedicated hardware, the scanner calibration logic 149 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 3–6, 7A–B, 8, and 9A–B show the architecture, functionality, and operation of an implementation of the scanner calibration logic 149. If embodied in software, each block may represent a module, segment, or portion of code that comprises one or more action statements in the form of executable instructions or declarations to implement the specified logical function(s). If embodied in hardware, each block may represent a circuit or a number of interconnected circuits to implement the specified logical function(s). Although the flow charts of FIGS. 3–6, 7A–B, 8, and 9A–B show a specific order of execution, it is understood that the order of execution may differ from that which is depicted. For example, the order of execution of two or more blocks may be scrambled relative to the order shown. Also, two or more blocks shown in succession in FIGS. 3–6, 7A–B, 8, and 9A–B may be executed concurrently or with partial concurrence. It is understood that all such variations are within the scope of the present invention. Also, the flow charts of FIGS. 3–6, 7A–B, 8, and 9A–B are relatively self-explanatory and are understood by those with ordinary skill in the art to the extent that software and/or hardware can be created by one with ordinary skill in the art to carry out the various logical functions as described herein.

Also, the scanner calibration logic 149 (FIG. 1) can be embodied in any computer-readable medium for use by or in connection with an instruction execution system such as a computer/processor based system or other system that can fetch or obtain the logic from the computer-readable medium and execute the instructions or action statements contained therein. In the context of this document, a "computer-readable medium" can be any medium that can contain, store, or maintain the scanner calibration logic 149 (FIG. 1) for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A method for calibrating an output from a sensor array in a scanner, comprising:

determining a minimum dark value for the sensor array;

determining an optimum exposure time of a number of light sources associated with the sensor array;

determining a maximum white value for the sensor array at the exposure time;

setting an analog offset based upon the minimum dark value; and setting an analog gain associated with the sensor array based on a sensor output range from the minimum dark value to a maximum white value.

2. The method of claim 1, wherein the step of determining the minimum dark value for the sensor array further comprises:

setting the exposure time to zero;

scanning the sensors in the sensor array with an exposure time of zero to obtain a dark value from each one of the sensors; and identifying a minimum one of the dark values as the minimum dark value.

3. The method of claim 1, further comprising verifying the analog offset and the analog gain.

4. The method of claim 3, wherein the verifying of the analog offset and the analog gain further comprises:

setting the exposure time to zero;

scanning a number of sensors in the sensor array to obtain a number of sensor values;

determining whether any one of the sensor values is clipped high by a circuit component to which the sensor values are applied; and disqualifying a sensor in the sensor array that generated the ones of the sensor values that are clipped high.

5. The method of claim 3 wherein the verifying of the analog offset and the analog gain further comprises:

setting the exposure time to the optimum exposure time;

scanning a number of sensors in the sensor array to obtain a number of sensor values;

determining whether any one of the sensor values is clipped low by a circuit component to which the sensor values are applied; and adjusting the analog offset and the analog gain if any one of the sensor values is clipped low.

6. The system of claim 3, wherein the logic for verifying the analog offset and the analog gain further comprises:

logic for setting the exposure time to zero;

logic for executing a scanning of a number of sensors in the sensor array to obtain a number of sensor values;

logic for determining whether any one of the sensor values is clipped high by a circuit component to which the sensor values are applied; and logic for disqualifying a sensor in the sensor array that generated the ones of the sensor values that are clipped high.

7. The system of claim 3, wherein the logic for verifying of the analog offset and the analog gain further comprises:

logic for setting the exposure time to the optimum exposure time;

logic for scanning a number of sensors in the sensor array to obtain a number of sensor values;

logic for determining whether any one of the sensor values is clipped low by a circuit component to which the sensor values are applied; and logic for adjusting the analog offset and the analog gain if any one of the sensor values is clipped low.

8. The method of claim 1, wherein the step of determining the optimum exposure time of the number of light sources associated with the sensor array further comprises determining a saturation exposure time of each one of a number sensors in the sensor array, wherein the sensors generate a corresponding number of saturation sensor values when scanned at the saturation exposure time.

9. A method for calibrating an output from a sensor array in a scanner, comprising:

determining a minimum dark value for the sensor array;

determining an optimum exposure time of a number of light sources associated with the sensor array;

determining a maximum white value for the sensor array at the exposure time;

setting an analog offset based upon the minimum dark value;

setting an analog gain associated with the sensor array based on a sensor output range from the minimum dark value to the maximum white value; and wherein the determining the minimum dark value for the sensor array further comprises:

setting the exposure time to zero;

scanning the sensors in the sensor array with an exposure time of zero to obtain a dark value from each one of the sensors; and identifying a minimum one of the dark values as the minimum dark value; and wherein the step of scanning the sensors in the sensor array with the exposure time of zero to obtain the dark value from each one of the sensors further comprises:

applying an analog offset equal to a midrange value of a predetermined sensor output range to an output of the sensor array;

applying a unity analog gain to the output of the sensor array; and scanning the sensors in the sensor array.

10. The method of claim 9, wherein the step of scanning the sensors in the sensor array with the exposure time of zero to obtain the dark value from each one of the sensors further comprises disqualifying any one of the sensors generating a corresponding one of the dark values below a predetermined threshold with the application of the analog offset equal to the midrange value of a predetermined sensor output range.

11. The method of claim 9, wherein the step of scanning the sensors in the sensor array with the exposure time of zero to obtain the dark value from each one of the sensors further comprises disqualifying any one of the sensors that generates the dark value above a predetermined threshold with the application of the analog offset equal to the midrange value of a predetermined sensor output range.

12. A method for calibrating an output from a sensor array in a scanner, comprising:

determining a minimum dark value for the sensor array;

determining an optimum exposure time of a number of light sources associated with the sensor array;

determining a maximum white value for the sensor array at the exposure time;

setting an analog offset based upon the minimum dark value;

setting an analog gain associated with the sensor array based on a sensor output range from the minimum dark value to the maximum white value; and wherein the step of setting an analog offset based upon the minimum dark value further comprises generating an analog offset that places the minimum dark value at a predefined threshold greater than the bottom of an operating sensor signal range.

13. A method for calibrating an output from a sensor array in a scanner, comprising:

determining a minimum dark value for the sensor array;

determining an optimum exposure time of a number of light sources associated with the sensor array;

determining a maximum white value for the sensor array at the exposure time;

setting an analog offset based upon the minimum dark value;

setting an analog gain associated with the sensor array based on a sensor output range from the minimum dark value to the maximum white value;

wherein the determining of the optimum exposure time of the number of light sources associated with the sensor array further comprises determining a saturation exposure time of each one of a number sensors in the sensor array, wherein the sensors generate a corresponding number of saturation sensor values when scanned at the saturation exposure time; and wherein the step of determining the saturation exposure time of each one of the number sensors in the sensor array further comprises:

maximizing the exposure time;

performing a scan with the sensor array; and disqualifying any of the sensors in the sensor array generating a sensor value below a predetermined minimum threshold.

14. A method for calibrating an output from a sensor array in a scanner, comprising:

determining a minimum dark value for the sensor array;

determining an optimum exposure time of a number of light sources associated with the sensor array;

determining a maximum white value for the sensor array at the exposure time;

setting an analog offset based upon the minimum dark value;

setting an analog gain associated with the sensor array based on a sensor output range from the minimum dark value to a maximum white value;

wherein the determining of the optimum exposure time of the number of light sources associated with the sensor array further comprises determining a saturation exposure time of each one of a number sensors in the sensor array, wherein the sensors generate a corresponding number of saturation sensor values when scanned at the saturation exposure time; and wherein the step of determining the saturation exposure time of each one of the number sensors in the sensor array further comprises:

setting the exposure time to a maximum exposure time and scanning the sensor array to obtain a first sensor value for each of the sensors;

repeatedly decrementing the exposure time by a predefined value and rescanning the sensor array to obtain a number of subsequent sensor values for each of the sensors; and maintaining a highest one of the first sensor value and the subsequent sensor values as the saturation exposure time for each one of the sensors.

15. A method for calibrating an output from a sensor array in a scanner, comprising:

determining a minimum dark value for the sensor array;

determining an optimum exposure time of a number of light sources associated with the sensor array;

determining a maximum white value for the sensor array at the exposure time;

setting an analog offset based upon the minimum dark value;

setting an analog gain associated with the sensor array based on a sensor output range from the minimum dark value to the maximum white value;

wherein the determining of the optimum exposure time of the number of light sources associated with the sensor array further comprises determining a saturation exposure time of each one of a number sensors in the sensor array, wherein the sensors generate a corresponding number of saturation sensor values when scanned at the saturation exposure time; and wherein the step of determining the optimum exposure time of the number of light sources associated with the sensor array further comprises:

determining a second exposure time at which the sensors generate a number of corresponding sensor values that are less than the saturation sensor values, respectively, by a predetermined threshold amount; and calculating a third sensor exposure time for each of the sensors between the second exposure time and the saturation exposure time.

16. The method of claim 15, wherein the step of calculating the third sensor exposure time for each of the sensors between the second exposure time and the saturation exposure time further comprises interpolating the third sensor exposure time for each of the sensors between the saturation exposure time and the second exposure time.

17. The method of claim 15, wherein the step of determining the optimum exposure time of the number of light sources associated with the sensor array further comprises determining a minimum one of the third sensor exposure times.

18. A system for calibrating an output from a sensor array in a scanner, comprising:

a processor circuit having a processor and a memory;

scanner calibration logic stored in the memory and executable by the processor, the scanner calibration logic comprising:

logic for determining a minimum dark value for the sensor array;

logic for determining an optimum exposure time of a number of light sources associated with the sensor array;

logic for determining a maximum white value for the sensor array at the exposure time;

logic for setting an analog offset based upon the minimum dark value; and logic for setting an analog gain associated with the sensor array based on a sensor output range from the minimum dark value to a maximum white value.

19. The system of claim 18, wherein the logic for determining the minimum dark value for the sensor array further comprises:

logic for setting the exposure time to zero;

logic for scanning the sensors in the sensor array with the exposure time of zero to obtain a dark value from each one of the sensors; and logic for identifying a minimum one of the dark values as the minimum dark value.

20. The system of claim 18, wherein the logic for determining the optimum exposure time of the number of light sources associated with the sensor array further comprises logic for determining a saturation exposure time of each one of a number sensors in the sensor array, wherein the sensors generate a corresponding number of saturation sensor values when scanned at the saturation exposure time.

21. The system of claim 18, further comprising logic for verifying the analog offset and the analog gain.

22. A system for calibrating an output from a sensor array in a scanner, comprising:

a processor circuit having a processor and a memory;

scanner calibration logic stored in the memory and executable by the processor, the scanner calibration logic comprising:

logic for determining a minimum dark value for the sensor array;

logic for determining an optimum exposure time of a number of light sources associated with the sensor array;

logic for determining a maximum white value for the sensor array at the exposure time;

logic for setting an analog offset based upon the minimum dark value; and logic for setting an analog gain associated with the sensor array based on a sensor output range from the minimum dark value to the maximum white value;

wherein the logic for determining the minimum dark value for the sensor array further comprises:

logic for setting the exposure time to zero;

logic for scanning the sensors in the sensor array with the exposure time of zero to obtain a dark value from each one of the sensors; and logic for identifying a minimum one of the dark values as the minimum dark value; and wherein the logic for scanning the sensors in the sensor array with the exposure time of zero to obtain the dark value from each one of the sensors further comprises:

logic for applying an analog offset equal to a midrange value of a predetermined sensor output range to an output of the sensor array;

logic for applying a unity analog gain to the output of the sensor array; and logic for scanning the sensors in the sensor array.

23. The system of claim 22, wherein the logic for scanning the sensors in the sensor array with the exposure time of zero to obtain the dark value from each one of the sensors further comprises logic for disqualifying any one of the sensors generating a corresponding one of the dark values below a predetermined threshold with the application of the analog offset equal to the midrange value of a predetermined sensor output range.

24. The system of claim 22, wherein the logic for scanning the sensors in the sensor array with the exposure time of zero to obtain the dark value from each one of the sensors further comprises logic for disqualifying any one of the sensors that generates the dark value above a predetermined threshold with the application of the analog offset equal to the midrange value of a predetermined sensor output range.

25. A system for calibrating an output from a sensor array in a scanner, comprising:

a processor circuit having a processor and a memory; and scanner calibration logic stored in the memory and executable by the processor, the scanner calibration logic comprising:

logic for determining a minimum dark value for the sensor array;

logic for determining an optimum exposure time of a number of light sources associated with the sensor array;

logic for determining a maximum white value for the sensor array at the exposure time;

logic for setting an analog offset based upon the minimum dark value;

logic for setting an analog gain associated with the sensor array based on a sensor output range from the minimum dark value to the maximum white value; and wherein the logic for setting an analog offset based upon the minimum dark value further comprises logic for generating an analog offset that places the minimum dark value at a predefined threshold greater than the bottom of an operating sensor signal range.

26. A system for calibrating an output from a sensor array in a scanner, comprising:

a processor circuit having a processor and a memory;

scanner calibration logic stored in the memory and executable by the processor, the scanner calibration logic comprising:

logic for determining a minimum dark value for the sensor array;

logic for determining an optimum exposure time of a number of light sources associated with the sensor array;

logic for determining a maximum white value for the sensor array at the exposure time;

logic for setting an analog offset based upon the minimum dark value;

logic for setting an analog gain associated with the sensor array based on a sensor output range from the minimum dark value to the maximum white value; and wherein the logic for determining the optimum exposure time of the number of light sources associated with the sensor array further comprises logic for determining a saturation exposure time of each one of a number sensors in the sensor array, wherein the sensors generate a corresponding number of saturation sensor values when scanned at the saturation exposure time; and wherein the logic for determining the saturation exposure time of each one of the number sensors in the sensor array further comprises:

logic for setting the exposure time to a maximum;

logic for performing a scan with the sensor array; and logic for disqualifying any of the sensors in the sensor array generating a sensor value below a predetermined minimum threshold.

27. A system for calibrating an output from a sensor array in a scanner, comprising:

a processor circuit having a processor and a memory;

scanner calibration logic stored in the memory and executable by the processor, the scanner calibration logic comprising:

logic for determining a minimum dark value for the sensor array;

logic for determining an optimum exposure time of a number of light sources associated with the sensor array;

logic for determining a maximum white value for the sensor array at the exposure time;

logic for setting an analog offset based upon the minimum dark value;

logic for setting an analog gain associated with the sensor array based on a sensor output range from the minimum dark value to the maximum white value; and wherein the logic for determining the optimum exposure time of the number of light sources associated with the sensor array further comprises logic for determining a saturation exposure time of each one of a number sensors in the sensor array, wherein the sensors generate a corresponding number of saturation sensor values when scanned at the saturation exposure time; and wherein the logic for determining the saturation exposure time of each one of the number sensors in the sensor array further comprises:

logic for setting the exposure time to a maximum exposure time and scanning the sensor array to obtain a first sensor value for each of the sensors;

logic for repeatedly decrementing the exposure time by a predefined value and rescanning the sensor array to obtain a number of subsequent sensor values for each of the sensors; and logic for maintaining a highest one of the first sensor value and the subsequent sensor values as the saturation exposure time for each one of the sensors.

28. A system for calibrating an output from a sensor array in a scanner, comprising:

a processor circuit having a processor and a memory;

scanner calibration logic stored in the memory and executable by the processor, the scanner calibration logic comprising:

logic for determining a minimum dark value for the sensor array;

logic for determining an optimum exposure time of a number of light sources associated with the sensor array;

logic for determining a maximum white value for the sensor array at the exposure time;

logic for setting an analog offset based upon the minimum dark value;

logic for setting an analog gain associated with the sensor array based on a sensor output range from the minimum dark value to the maximum white value; and wherein the logic for determining the optimum exposure time of the number of light sources associated with the sensor array further comprises:

logic for determining a saturation exposure time of each one of a number sensors in the sensor array, wherein the sensors generate a corresponding number of saturation sensor values when scanned at the saturation exposure time; and logic for determining a second exposure time at which the sensors generate a number of corresponding sensor values that are less than the saturation sensor values, respectively, by a predetermined threshold amount; and logic for calculating a third sensor exposure time for each of the sensors between the second exposure time and the saturation exposure time.

29. The system of claim 28, wherein the logic for calculating the third sensor exposure time for each of the sensors between the second exposure time and the saturation exposure time further comprises logic for interpolating the third sensor exposure time for each of the sensors between the saturation exposure time and the second exposure time.

30. The system of claim 28, wherein the logic for determining the optimum exposure time of the number of light sources associated with the sensor array further comprises logic for determining a minimum one of the third sensor exposure times.

31. A system for calibrating an output from a sensor array in a scanner, comprising:

means for determining a minimum dark value for the sensor array;

means for determining an optimum exposure time of a number of light sources associated with the sensor array;

means for determining a maximum white value for the sensor array at the exposure time;

means for setting an analog offset based upon the minimum dark value; and means for setting an analog gain associated with the sensor array based on a sensor output range from the minimum dark value to a maximum white value.

32. The system of claim 31, wherein the means for determining the minimum dark value for the sensor array further comprises:
- means for setting the exposure time to zero;
- means for scanning the sensors in the sensor array with the exposure time of zero to obtain a dark value from each one of the sensors; and
- means for identifying a minimum one of the dark values as the minimum dark value.

33. The system of claim 31, wherein the means for determining the optimum exposure time of the number of light sources associated with the sensor array further comprises means for determining a saturation exposure time of each one of a number sensors in the sensor array, wherein the sensors generate a corresponding number of saturation sensor values when scanned at the saturation exposure time.

34. The system of claim 31, further comprising means for verifying the analog offset and the analog gain.

35. The system of claim 34, wherein the means for verifying the analog offset and the analog gain further comprises:
- means for setting the exposure time to zero;
- means for executing a scanning of a number of sensors in the sensor array to obtain a number of sensor values;
- means for determining whether any one of the sensor values is clipped high by a circuit component to which the sensor values are applied; and
- means for disqualifying a sensor in the sensor array that generated the ones of the sensor values that are clipped high.

36. The system of claim 34, wherein the means for verifying of the analog offset and the analog gain further comprises:
- means for setting the exposure time to the optimum exposure time;
- means for scanning a number of sensors in the sensor array to obtain a number of sensor values;
- means for determining whether any one of the sensor values is clipped low by a circuit component to which the sensor values are applied; and
- means for adjusting the analog offset and the analog gain if any one of the sensor values is clipped low.

37. A system for calibrating an output from a sensor array in a scanner, comprising:
- means for determining a minimum dark value for the sensor array;
- means for determining an optimum exposure time of a number of light sources associated with the sensor array;
- means for determining a maximum white value for the sensor array at the exposure time;
- means for setting an analog offset based upon the minimum dark value; and
- means for setting an analog gain associated with the sensor array based on a sensor output range from the minimum dark value to the maximum white value; and
- wherein the means for determining the minimum dark value for the sensor array further comprises:
  - means for setting the exposure time to zero;
  - means for scanning the sensors in the sensor array with the exposure time of zero to obtain a dark value from each one of the sensors; and
  - means for identifying a minimum one of the dark values as the minimum dark value; and
- wherein the means for scanning the sensors in the sensor array with the exposure time of zero to obtain the dark value from each one of the sensors further comprises:
  - means for applying an analog offset equal to a midrange value of a predetermined sensor output range to an output of the sensor array;
  - means for applying a unity analog gain to the output of the sensor array; and
  - means for scanning the sensors in the sensor array.

38. The system of claim 37, wherein the means for scanning the sensors in the sensor array with the exposure time of zero to obtain the dark value from each one of the sensors further comprises means for disqualifying any one of the sensors generating a corresponding one of the dark values below a predetermined threshold with the application of the analog offset equal to the midrange value of a predetermined sensor output range.

39. The system of claim 37, wherein the means for scanning the sensors in the sensor array with the exposure time of zero to obtain the dark value from each one of the sensors further comprises means for disqualifying any one of the sensors that generates the dark value above a predetermined threshold with the application of the analog offset equal to the midrange value of a predetermined sensor output range.

40. A system for calibrating an output from a sensor array in a scanner, comprising:
- means for determining a minimum dark value for the sensor array;
- means for determining an optimum exposure time of a number of light sources associated with the sensor array;
- means for determining a maximum white value for the sensor array at the exposure time;
- means for setting an analog offset based upon the minimum dark value means for setting an analog gain associated with the sensor array based on a sensor output range from the minimum dark value to the maximum white value; and
- wherein the means for setting an analog offset based upon the minimum dark value further comprises means for generating an analog offset that places the minimum dark value at a predefined threshold greater than the bottom of an operating sensor signal range.

41. A system for calibrating an output from a sensor array in a scanner, comprising:
- means for determining a minimum dark value for the sensor array;
- means for determining an optimum exposure time of a number of light sources associated with the sensor array;
- means for determining a maximum white value for the sensor array at the exposure time;
- means for setting an analog offset based upon the minimum dark value; means for setting an analog gain associated with the sensor array based on a sensor output range from the minimum dark value to the maximum white value;
- wherein the means for determining the optimum exposure time of the number of light sources associated with the sensor array further comprises means for determining a saturation exposure time of each one of a number sensors in the sensor array, wherein the sensors generate a corresponding number of saturation sensor values when scanned at the saturation exposure time; and wherein the means for determining the saturation exposure time of each one of the number sensors in the sensor array further comprises:
  means for setting the exposure time to a maximum;
  means for performing a scan with the sensor array; and
  means for disqualifying any of the sensors in the sensor array generating a sensor value below a predetermined minimum threshold.

42. A system for calibrating an output from a sensor array in a scanner, comprising:
  means for determining a minimum dark value for the sensor array;
  means for determining an optimum exposure time of a number of light sources associated with the sensor array;
  means for determining a maximum white value for the sensor array at the exposure time;
  means for setting an analog offset based upon the minimum dark value;
  means for setting an analog gain associated with the sensor array based on a sensor output range from the minimum dark value to the maximum white value;
  wherein the means for determining the optimum exposure time of the number of light sources associated with the sensor array further comprises means for determining a saturation exposure time of each one of a number sensors in the sensor array, wherein the sensors generate a corresponding number of saturation sensor values when scanned at the saturation exposure time; and
  wherein the means for determining the saturation exposure time of each one of the number sensors in the sensor array further comprises:
    means for setting the exposure time to a maximum exposure time and scanning the sensor array to obtain a first sensor value for each of the sensors;
    means for repeatedly decrementing the exposure time by a predefined value and rescanning the sensor array to obtain a number of subsequent sensor values for each of the sensors; and
    means for maintaining a highest one of the first sensor value and the subsequent sensor values as the saturation exposure time for each one of the sensors.

43. A system for calibrating an output from a sensor array in a scanner, comprising:
  means for determining a minimum dark value for the sensor array;
  means for determining an optimum exposure time of a number of light sources associated with the sensor array;
  means for determining a maximum white value for the sensor array at the exposure time;
  means for setting an analog offset based upon the minimum dark value;
  means for setting an analog gain associated with the sensor array based on a sensor output range from the minimum dark value to the maximum white value;
  wherein the means for determining the optimum exposure time of the number of light sources associated with the sensor array further comprises means for determining a saturation exposure time of each one of a number sensors in the sensor array, wherein the sensors generate a corresponding number of saturation sensor values when scanned at the saturation exposure time; and
  wherein the means for determining the optimum exposure time of the number of light sources associated with the sensor array further comprises:
    means for determining a second exposure time at which the sensors generate a number of corresponding sensor values that are less than the saturation sensor values, respectively, by a predetermined threshold amount; and
    means for calculating a third sensor exposure time for each of the sensors between the second exposure time and the saturation exposure time.

44. The system of claim 43, wherein the means for calculating the third sensor exposure time for each of the sensors between the second exposure time and the saturation exposure time further comprises means for interpolating the third sensor exposure time for each of the sensors between the saturation exposure time and the second exposure time.

45. The system of claim 43, wherein the means for determining the optimum exposure time of the number of light sources associated with the sensor array further comprises means for determining a minimum one of the third sensor exposure times.

* * * * *

UNITED STATES PATENT AND TRADEMARK OFFICE
CERTIFICATE OF CORRECTION

PATENT NO. : 6,571,189 B2
DATED : May 27, 2003
INVENTOR(S) : Jensen et al.

Page 1 of 1

It is certified that error appears in the above-identified patent and that said Letters Patent is hereby corrected as shown below:

Column 1,
Line 55, delete "forgoing", and insert therefor -- foregoing --.

Column 3,
Line 33, delete "processes", and insert therefore -- process --.

Column 16,
Line 58, after the word "number" insert -- of --.

Column 19,
Line 57, after the word "number" insert -- of --.

Column 21,
Line 24, after the word "number" insert -- of --.

Column 23,
Line 14, after the word "number" insert -- of --.

Column 24,
Line 64, after the word "number" insert -- of --.

Column 25,
Line 32, after the word "number" insert -- of --.

Column 26,
Line 18, after the word "number" insert -- of --.

Signed and Sealed this

Sixteenth Day of August, 2005

JON W. DUDAS
*Director of the United States Patent and Trademark Office*